US012786827B2

(12) United States Patent
Dai et al.

(10) Patent No.: US 12,786,827 B2
(45) Date of Patent: Nov. 3, 2026

(54) METHOD AND APPARATUS FOR MULTICAST AND BROADCAST SERVICES

(71) Applicant: LENOVO (BEIJING) LIMITED, Beijing (CN)

(72) Inventors: Mingzeng Dai, Shanghai (CN); Lianhai Wu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 633 days.

(21) Appl. No.: 18/040,833

(22) PCT Filed: Aug. 7, 2020

(86) PCT No.: PCT/CN2020/107796

§ 371 (c)(1),
(2) Date: Feb. 7, 2023

(87) PCT Pub. No.: WO2022/027582

PCT Pub. Date: Feb. 10, 2022

(65) Prior Publication Data

US 2023/0292200 A1 Sep. 14, 2023

(51) Int. Cl.
*H04W 36/08* (2009.01)
*H04W 36/02* (2009.01)

(52) U.S. Cl.
CPC ....... *H04W 36/08* (2013.01); *H04W 36/0235* (2023.05)

(58) Field of Classification Search
CPC . H04W 36/00; H04W 36/08; H04W 36/0235; H04L 47/34; H04L 1/1841
See application file for complete search history.

(56) References Cited

U.S. PATENT DOCUMENTS

| | | | | |
|---|---|---|---|---|
| 2009/0207773 | A1 | 8/2009 | Feng et al. | |
| 2019/0268815 | A1* | 8/2019 | Zhu | H04W 36/0016 |
| 2022/0263750 | A1* | 8/2022 | Kousaridas | H04L 47/34 |

FOREIGN PATENT DOCUMENTS

| | | | |
|---|---|---|---|
| CN | 102651892 | A | 8/2012 |
| CN | 107690158 | A | 2/2018 |
| CN | 110636568 | A | 12/2019 |
| EP | 3799472 | A1 | 3/2021 |
| JP | 2010-531115 | A | 9/2010 |
| JP | 2011-5302063 | A | 12/2011 |
| WO | 2020001426 | | 1/2020 |

(Continued)

OTHER PUBLICATIONS

Patent Cooperation Treaty (PCT) International Application No. PCT/CN/2020/107796, International Search Report and Written Opinion, Apr. 25, 2021.

(Continued)

*Primary Examiner* — Shukri Taha
(74) *Attorney, Agent, or Firm* — Isidore PLLC

(57) ABSTRACT

The present disclosure relates to a method and an apparatus for multicast and broadcast services. A method for a handover of a user equipment (UE) from a first NodeB to a second NodeB and performed by the first NodeB. The method comprise: transmitting at least one first data packet to the UE; receiving, from a core network, an alignment indication.

5 Claims, 12 Drawing Sheets

(56) References Cited

FOREIGN PATENT DOCUMENTS

WO WO-2020089849 A1 * 5/2020 ........ H04W 36/0044

OTHER PUBLICATIONS

3GPP "Technical Specification Group Services and System Aspects: Study on architectural enhancements for 5G multicast-broadcast services (Release 17)", 3GPP TR 23.757 VO.4.0 Jun. 22, 2020, chapters 6.3.2, 6.24.2, 6.27.2.

European Search Report, European Application No. 20948020.1, mailed Apr. 10, 2024.

3GPP TSG-RAN WG2 #111e, "Mobility for NR MBS", R2-2007628, Electronic Meeting, Aug. 17-28, 2020.

3GPP TR 23.757 3rd Generation Partnership Project; Technical Specification Group Services and System Aspects; Study on architectural enhancements for 5G multicast-broadcast services (Release 17), Jun. 2020.

3GPP TSG-RAN WG3 Meeting #109-E, "Service continuity CP and UP aspects during mobility" R3-204691, Aug. 17-28, 2020.

Japan Patent Office, Japanese Patent Application No. 2023-508483, Notice of Allowance dated Dec. 16, 2024.

Qualcomm Incororporated, "Solution to KI#7: Mobility between 5G MBS supporting and 5G MBS non-supporting NG RAN nodes", SA WG2 Meeting #139E, S2-2004223, Electronic meeting, Jun. 1-12, 2020; 4 pages.

Supplementary European Search Report, European Application No. 20948020.1, mailed Jul. 15, 2024.

Ericsson: "Mobility for NR MBS" 3GPPDraft; R2-2007628, Aug. 6, 2020, XP051911084.

Ericsson: "Protocol structure and bearer modelling for NR MBS", 3GPP Draft; R2-2007631, Aug. 6, 2020, XP051911085.

China National Intellectual Property Administration, PRC Patent Application No. 202080103109.1, Office Action, Jul. 10, 2024.

S2-2004510_3966r08 KI#7 New Solution for MBS Session Handover, Jun. 14, 2020.

Japan Patent Office, Japanese Patent Application No. 2025-0004787, Office Action dated Apr. 7, 2026.

* cited by examiner

600

UE 104 loses the packet #2 because SN misalignment bet ween source gNB and target gNB

100

Via a dedicated DRB , UE 104 receives the packets forwarded from the source gNB to the target gNB ; UE 104 recives packets via the SC-PTM MRB from the target gNB as well.

METHOD AND APPARATUS FOR MULTICAST AND BROADCAST SERVICES

TECHNICAL FIELD

Embodiments of the present disclosure generally relate to wireless communication technology, especially to a method and apparatus for multicast and broadcast services (MBS).

BACKGROUND

In new radio (NR) Rel-17, the MBS plans to focus on a small area mixed mode multicast (also referred to as Objective A in the TR 23.757). It is desired to enable general MBS services over 5G system (5GS) and to identify use cases that could benefit from this feature. These use cases include but are not limited to: public safety and mission critical, vehicle to everything (V2X) applications, transparent internet protocol version 4 (IPv4)/internet protocol version 6 (IPv6) multicast delivery, internet protocol television (IPTV), software delivery over wireless, group communications and internet of things (IoT) applications. In these use cases, the service continuity and reliability are highly required.

SUMMARY OF THE APPLICATION

Some embodiments of the present disclosure at least provide a technical solution for multicast and broadcast services.

Some embodiments of the present disclosure provide a method for a handover of a user equipment (UE) from a first NodeB to a second NodeB and performed by the first NodeB. The method may include: transmitting at least one first data packet; receiving, from a core network, an alignment indication.

Some other embodiments of the present disclosure provide a method for a handover of a user equipment (UE) from a first NodeB to a second NodeB and performed by the second NodeB. The method may include: receiving a handover message from the first NodeB; and transmitting a plurality of data packets to the UE based on an alignment indication.

Some other embodiments of the present disclosure provide a method for a handover from a first NodeB to a second NodeB, and performed by a network entity. The method may include: transmitting a plurality of data packets of a traffic over a shared GTP-U tunnel with the first NodeB; transmitting the plurality of data packets of the traffic over a shared GTP-U tunnel with the second NodeB; receiving a path switch indication message from the second NodeB indicating the handover from the first NodeB to the second NodeB; and transmitting sending an alignment indication to the first NodeB.

Some other embodiments of the present disclosure provide a method for a handover of a user equipment (UE) from a first NodeB to a second NodeB, and performed by the UE. The method may include: receiving at least one first data packet from the second NodeB via a unicast bearer; and receiving at least one second data packet from the second NodeB; wherein, the at least one first data packet is forwarded from the first NodeB.

Some other embodiments of the present disclosure provide a method performed by an anchor NodeB. The method may include: receiving a data packet from a core network; assigning a sequence number for the data packet.

Some other embodiments of the present disclosure provide a method performed by a NodeB. The method may include: receiving an anchor indication message indicating an anchor NodeB; and receiving, from the anchor NodeB, a sequence number of a data packet of a multicast or broadcast service.

Some embodiments of the present disclosure also provide an apparatus, include: at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement any method as stated above with the at least one receiver, the at least one transmitter and the at least one processor.

Embodiments of the present disclosure provide a technical solution for for multicast and broadcast services. Accordingly, embodiments of the present disclosure can provide lossless data transmission while handover between gNodeBs (gNBs).

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as 3GPP 5G New Radio (NR), 3GPP LTE Release 8 and so on. Persons skilled in the art know very well that, with the development of network architecture and new service scenarios, the embodiments in the present disclosure are also applicable to similar technical problems.

Figure 1:
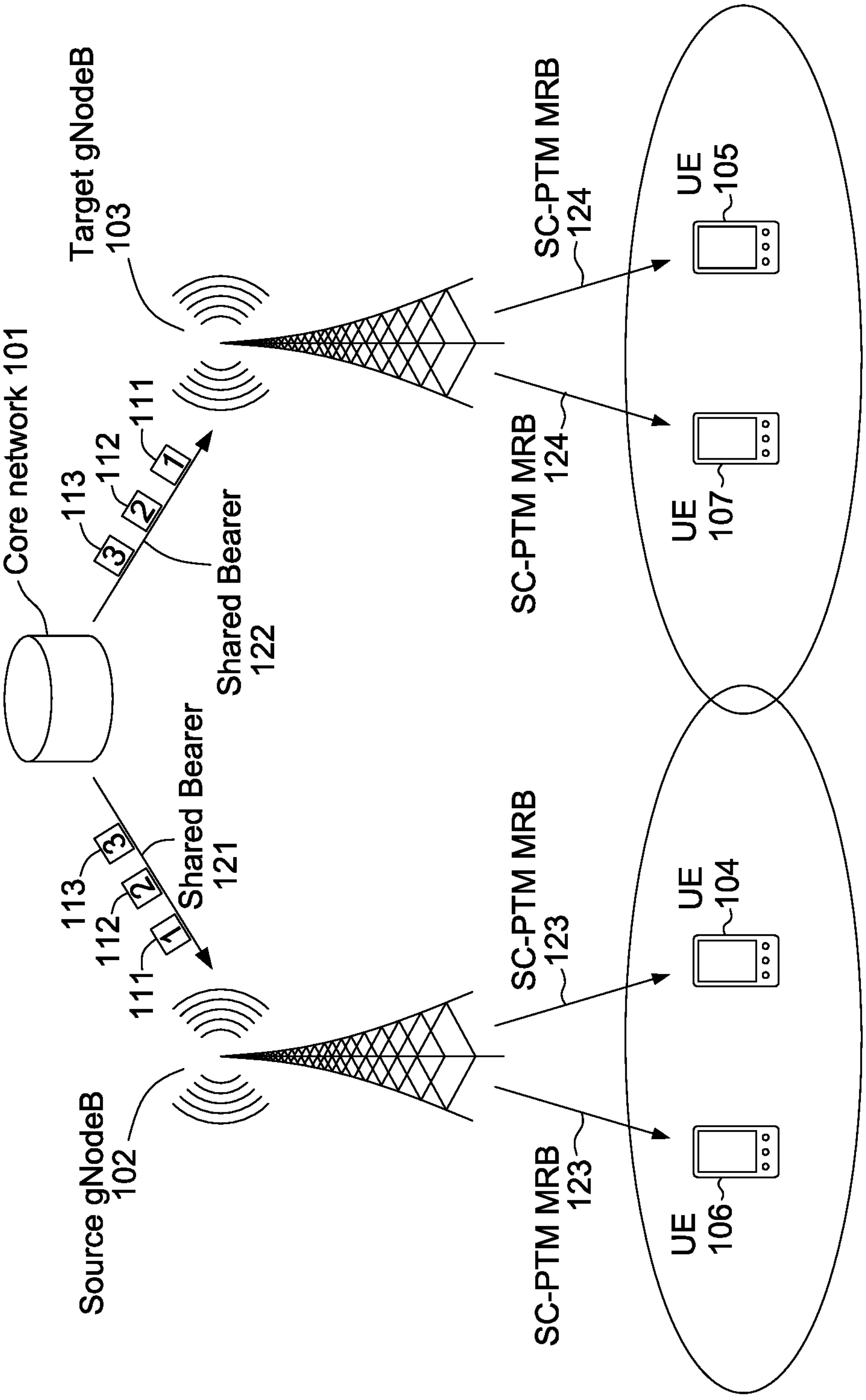
FIG. 1 is a schematic diagram illustrating an exemplary wireless communication system according to some embodiments of the present disclosure.

FIG. 1 is a schematic diagram illustrating an exemplary wireless communication system 10 according to an embodiment of the present disclosure.

As shown in FIG. 1, a wireless communication system 10 may include at least one core network, at least one base station and at least one UE. The wireless communication system 10 is compatible with any type of network that is capable of sending and receiving wireless communication signals. For example, the wireless communication system 10 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G NR network, a satellite communications network, a high altitude platform network, and/or other communications networks.

The base station may be referred to as a base unit, a base, an access point, an access terminal, a macro cell, a Node-B, an enhanced Node B (eNB), a gNB, a Home Node-B, a relay node, a device, a remote unit, or by any other terminology used in the art. A base station may be distributed over a geographic region. Generally, a base station is a part of a radio access network that may include one or more controllers communicably coupled to one or more corresponding base stations.

The base station is generally communicably coupled to one or more packet core networks (PCN), which may be coupled to other networks, like the packet data network (PDN) (e.g., the Internet) and public switched telephone networks, among other networks. These and other elements of radio access and core networks are not illustrated but are well known generally by those having ordinary skill in the art. For example, one or more base stations may be communicably coupled to a mobility management entity (MME), a serving gateway (SGW), and/or a packet data network gateway (PGW). For example, one or more base stations may be communicably coupled to an Access and Mobility Management Function (AMF), a User Plane Function (UPF), and/or a Session Management Function (SMF) in 5G core network.

Embodiments of the present disclosure may be provided in a network architecture that adopts various service scenarios, for example but is not limited to, 3GPP 3G, long-term evolution (LTE), LTE-Advanced (LTE-A), 3GPP 4G, 3GPP 5G NR (new radio), 3GPP LTE Release 12 and onwards, etc. It is contemplated that along with the 3GPP and related communication technology development, the terminologies recited in the present application may change, which should not affect the principle of the present application.

In particular, the wireless communication system 10 includes one core network 101, two gNBs 102, 103, and four UEs 104-107 for illustrative purpose. Although a specific number of core network, gNBs, and UEs are depicted in FIG. 1, it is contemplated that any number of core network, gNBs, and UEs may be included in the wireless communication system 10.

The core network in the communication system 10 may be a 5G Core Network interconnected between a wide area network (such as an Internet Protocol (IP) services network) and radio access network nodes (such as an eLTE enhanced node B (eNB) radio access network node, a 5G gNB radio access network node, and gNB 102 and 103). The core network may be one or more apparatuses or services between a wide area network and radio access network nodes.

The UEs 104, 105, 106, and 107 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 104-107 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UEs 104-107 may include wearable devices, such as smart watches, fitness bands, optical head-mounted displays, or the like. Moreover, the UEs 104-107 may be referred to as a subscriber unit, a mobile, a mobile station, a user, a terminal, a mobile terminal, a wireless terminal, a fixed terminal, a subscriber station, a user terminal, or a device, or described using other terminology used in the art.

The gNB 102 may receive the packets 111 112, and 113 (i.e., packets #1, #2, and #3) from the core network 101 via the shared bearer 121. The shared bearer 121 may be a GPRS Tunneling Protocol User plane (GTP-U) tunnel (GPRS referring to General Packet Radio Service). The gNB 102 may transmit the same MBS data (e.g., the packets 111, 112, and 113) to the UE 104 and UE 106 which are under the coverage of gNB 102. For example, the MBS data may be transmitted to the UE 104 and UE 106 via a Point-to-Multipoint (PTM) mode. The MBS data may be transmitted to the UE 104 and UE 106 via a Single Cell Point-to-Multipoint Multicast Radio Bearer (SC-PTM MRB) 123.

The gNB 103 may receive the packets 111 112, and 113 (i.e., packets #1, #2, and #3) from the core network 101 via the shared bearer 122. The shared bearer 122 may be a GTP-U tunnel. The gNB 103 may transmit the same MBS data (e.g., the packets 111, 112, and 113) to the UE 105 and UE 107 which are under the coverage of gNB 103. For example, the MBS data may be transmitted to the UE 105 and UE 107 via a PTM mode. The MBS data may be transmitted to the UE 105 and UE 107 via a SC-PTM MRB 124. In the cases that UE 104 and/or US 106 may move from the coverage of the gNB 102 to the coverage of the gNB 103 and that UE 105 and/or US 107 may move from the coverage of the gNB 103 to the coverage of the gNB 102, handovers of the UEs 104-107 occur.

MBS may be applied to public safety and mission critical, V2X applications, transparent IPv4/IPv6 multicast delivery, IPTV, software delivery over wireless, group communications and IoT applications. In these use cases, the service continuity and reliability are highly required. For example, for a software download no packet should be missed during handover.

Figure 2:
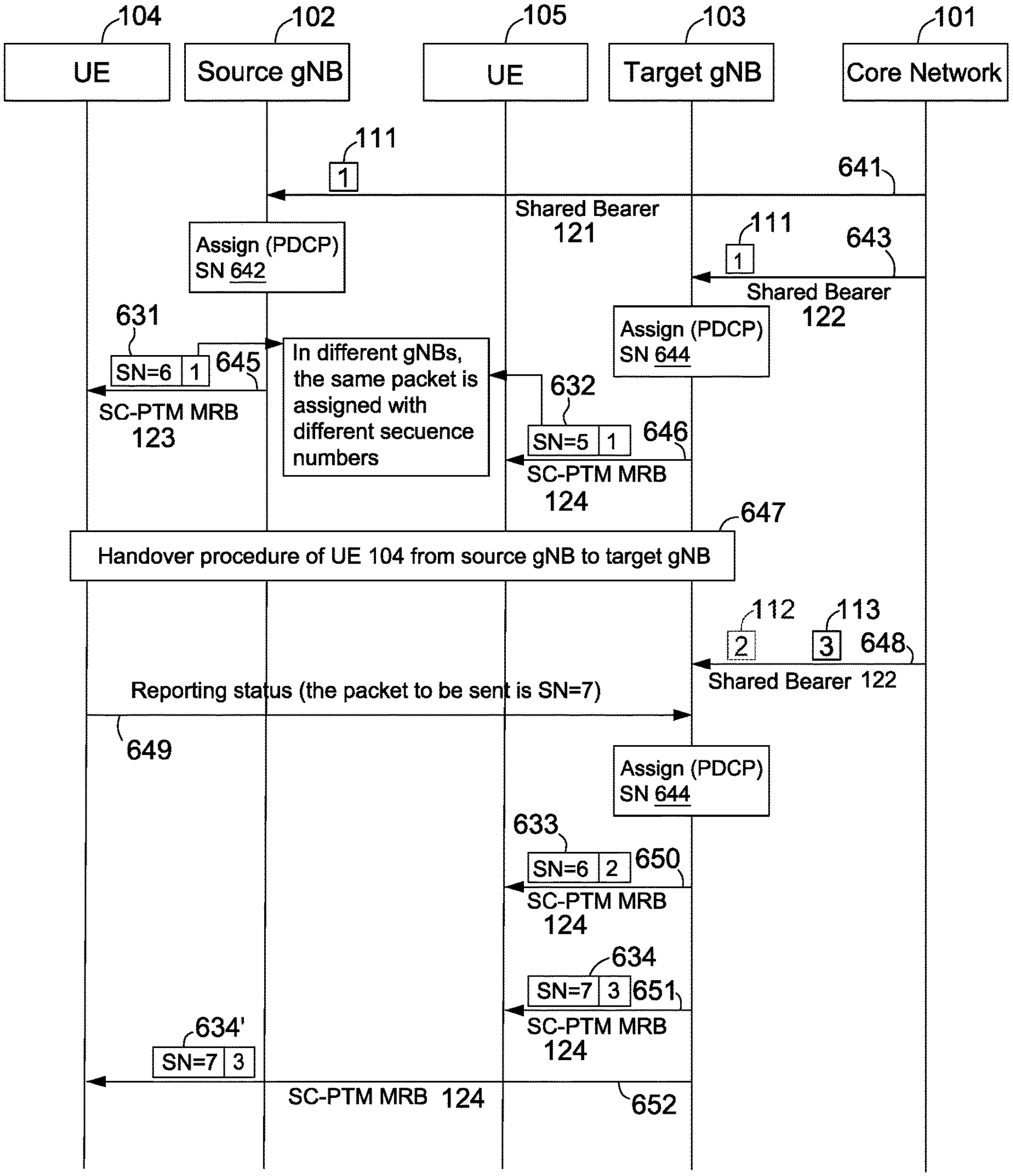
FIG. 2 is a flow diagram illustrating a method for MBS with a handover procedure according to some embodiments of the present disclosure.

FIG. 2 is a flow diagram illustrating a method for MBS with a handover procedure according to some embodiments of the present disclosure.

In LTE or NR, the service continuity is supported between source and target gNBs (or eNBs) for handover. In order to support lossless data transmission, upon handover, the source gNB may forward, to the target gNB, all downlink Packet Data Convergence Protocol (PDCP) Service Data Units (SDUs) with their Sequence Number (SN) that have not been acknowledged by the UE to be handover. In addition, the source gNB may also forward fresh data without a PDCP SN to the target gNB. The PDCP SN of forwarded SDUs is carried in the "PDCP PDU number" field of the GTP-U extension header (PDU referring to Protocol Data Unit). The target gNB shall use the PDCP SN if it is available in the forwarded GTP-U packet. Since in-sequence delivery during handover is based on a continuous PDCP SN, PDCP SN allocation should be aligned between source gNB and target gNB.

In view of the above, 5G MBS needs to support service continuity for mobility between gNBs which means lossless handover should be supported. Since in-sequence delivery during handover is based on a continuous PDCP SN (or PDCP COUNT value), PDCP SN (or PDCP COUNT value) should be aligned between source gNB and target gNB. However, the 5G MBS needs to support PTM mode. In PTM mode, the 5G MBS service is multicast over one or more multiple cells. The source gNB and target gNB may assign independent SN (or COUNT value) for the same packet from core network. The SN (or COUNT value) misalignment between gNBs may cause packet lost during handover from source gNB to target gNB.

In the exemplary method shown in FIG. 2, the core network 101 may transmit MBS data (i.e., packet 111 or packet #1) to the source gNB 102 and the target gNB 103. In operation 641 of FIG. 2, the core network 101 transmits the packet 111 (or packet #1) to the source gNB 102 via a shared bearer 121. In operation 643 of FIG. 2, the core network 101 transmits the same packet 111 (or packet #1) to the target gNB 103 via a shared bearer 122. The shared bearers 121 and 122 may be GTP-U tunnels.

Upon receipt of the MB S data from the core network, the source gNB 102 assigns SNs (or PDCP SNs) for the received MBS data. In operation 642 of FIG. 2, the source gNB 102 assigns a SN, e.g., 6, for the received packet 111 (or packet #1). The source gNB 102 may transmit the packet with the assigned SN (e.g., a PDCP PDU with the assigned PDCP SN) to an UE under the coverage of the source gNB 102 (e.g., UE 104). In operation 645 of FIG. 2, the source gNB 102 transmits the packet 631 (including packet #1 and SN=6) to the UE 104 via the SC-PTM MRB 123.

Upon receipt of the MBS data from the core network, the target gNB 103 assigns SNs (or PDCP SNs) for the received MBS data. In operation 644 of FIG. 2, the target gNB 103 assigns a SN, e.g., 5, for the received packet 111 (or packet #1). The target gNB 103 may transmit the packet with the assigned SN (e.g., a PDCP PDU with the assigned PDCP SN) to an UE under the coverage of the target gNB 103 (e.g., UE 105). In operation 646 of FIG. 2, the target gNB 103 transmits the packet 632 (including packet #1 and SN=5) to the UE 105 via the SC-PTM MRB 124.

In different gNBs, the same packet (e.g., packet 111 or packet #1) may be assigned with different SNs. In FIG. 2, the packet 111 (or packet #1) is assigned with SN=6 by gNB 102, and the packet 111 (or packet #1) is assigned with SN=5 by gNB 103.

In the case that UE 104 moves from the coverage of the source gNB 102 to the coverage of the target gNB 103, a handover of UE 104 occurs. In operation 647 in FIG. 2, a handover procedure of UE 104 from the source gNB 102 to the target gNB 103 is triggered.

The MBS session for UE 105 under the target gNB 103 may be still activated, the corresponding MB S data may be transmitted from the core network 101 to the target gNB 103. In operations 648 of FIG. 2, the core network 101 transmits the packets 112 and 113 (or packets #2 and #3) to the target gNB 103. Upon receipt of the MBS data from the core network, the target gNB 103 assigns SNs (or PDCP SNs) for the received MBS data. In FIG. 2, the operation 644 is performed again upon the receipt of the packets 112 and 113 (or packets #2 and #3), and the target gNB 103 assigns SNs for the packets 112 and 113 (or packets #2 and #3).

After or during a handover procedure, the source gNB 102 informs the target gNB 103 of all PDCP SDUs with their SNs that have not been acknowledged by the UE to be handover. For example, the source gNB 102 may report the target gNB 103 the SN of the next packet to be sent or to be received. In operation 649 of FIG. 2, the source gNB 102 reports the next packet to be sent (or to be received via the shared bearer 122) is SN=7.

The target gNB 103 may transmit the packet with the assigned SN (e.g., a PDCP PDU with the assigned PDCP SN) to the UE 105. In operation 650 of FIG. 2, the target gNB 103 transmits the packet 633 (including packet #2 and SN=6) to the UE 105 via the SC-PTM MRB 124. In operation 651 of FIG. 2, the target gNB 103 transmits the packet 634 (including packet #2 and SN=6) to the UE 105 via the SC-PTM MRB 124.

The target gNB 103 may transmit the first packet to the newly entered UE based on the UE's report. In operation 652 in FIG. 2, based on the report from the UE 104, the target gNB 103 transmits packet 634' (including packet #3 and SN=7; which is identical to packet 634) because the UE 104 reports that the next packet to be sent (or to be received) is SN=7. The UE 104 does not receive packet 112 (or packet #2) from the source gNB or from the target gNB. Because of SN misalignment between the source gNB and the target gNB, UE 104 loses the packet 112 (or packet #2).

Figure 3:
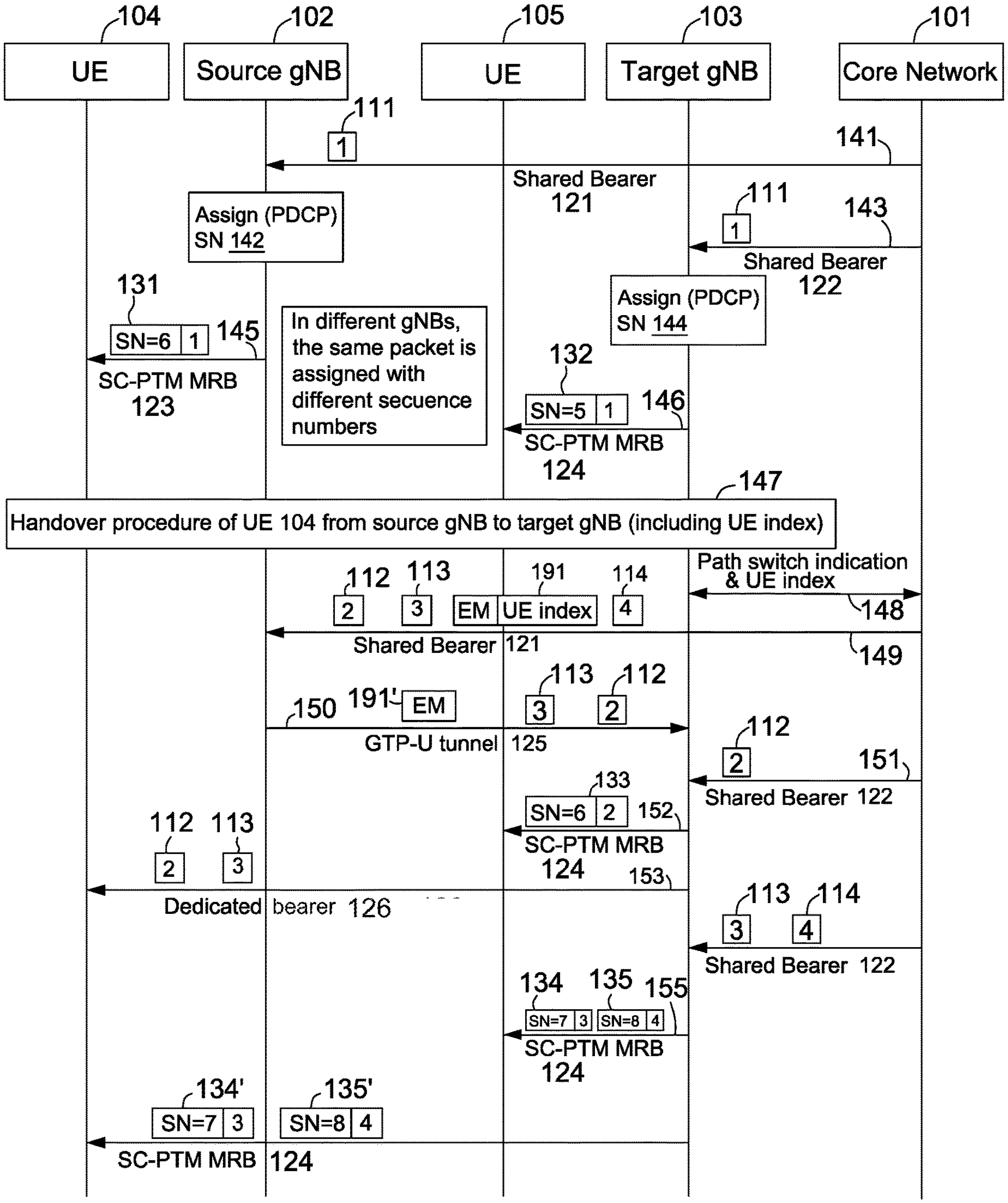
FIG. 3 illustrates a flow diagram illustrating a method for MBS with smooth handover according to some embodiments of the present disclosure.

FIG. 3 is a flow diagram illustrating a method for MBS with smooth handover according to some embodiments of the present disclosure.

In the exemplary method shown in FIG. 3, an End Marker indication (e.g., included in packet 191 or 191') and a dedicated bearer for service continuity are introduced. The End Marker indication may indicate an end of data packets to be transmitted from the source gNB to the target gNB. In some embodiments, an End Marker indication may be unique for an UE. During or after the handover procedure of the UE 104, the target gNB 103 may receive forwarded data and an End Marker indication from the source gNB 102. The target gNB may transmit the forwarded data to the UE 104 via a dedicated bearer. The UE receives the forwarded packets via the dedicated bearer and receives packets via a new SC-PTM MRB. With the End Marker indication and the dedicated bearer, the lossless and seamless handover may be supported.

In FIG. 3, the UE 104 may receive the 5G MBS service in a PTM mode by a MRB (e.g., SC-PTM MRB) from the source gNB 102. A shared bearer (e.g., a shared GTP-U tunnel) may be used between the core network 101 (e.g. a User Plane Function (UPF) in a 5G core network) and the source gNB 102. The shared bearer 121 may transmit data packets of the 5G MBS service for the uses of a PTM mode and/or a PTP mode, and/or a MRB and/or unicast data radio bearers (DRBs). The target gNB 103 may also have a MRB for the same MBS service data transmission in PTM mode. For example, the MRB of the source gNB 102 may be SC-PTM MRB 123 and the MRB of the target gNB 103 may be SC-PTM MRB 124.

In the exemplary method shown in FIG. 3, the core network 101 may transmit MBS data (i.e., packet 111 or packet #1) to the source gNB 102 and the target gNB 103. In operation 141 of FIG. 3, the core network 101 transmits the packet 111 (or packet #1) to the source gNB 102 via a shared bearer 121. In operation 143 of FIG. 3, the core network 101 transmits the same packet 111 (or packet #1) to the target gNB 103 via a shared bearer 122. The shared bearers 121 and 122 may be GTP-U tunnels. The shared bearer may be also called as common bearer or common GTP-U tunnel.

Upon receipt of the MBS data from the core network, the source gNB 102 assigns SNs (or PDCP SNs or PDCP count values) for the received MBS data. In operation 142 of FIG. 3, the source gNB 102 assigns a SN, e.g., 6, for the received packet 111 (or packet #1). The source gNB 102 may transmit the packet with the assigned SN (e.g., a PDCP PDU with the assigned PDCP SN) to an UE under the coverage of the source gNB 102 (e.g., UE 104). In operation 145 of FIG. 3, the source gNB 102 transmits the packet 131 (including packet #1 and SN=6) via the SC-PTM MRB 123.

Upon receipt of the MBS data from the core network, the target gNB 103 assigns SNs (or PDCP SNs) for the received MBS data. In operation 144 of FIG. 3, the target gNB 103 assigns a SN, e.g., 5, for the received packet 111 (or packet #1). The target gNB 103 may transmit the packet with the assigned SN (e.g., a PDCP PDU with the assigned PDCP SN) to an UE under the coverage of the target gNB 103 (e.g., UE 105). In operation 146 of FIG. 3, the target gNB 103 transmits the packet 132 (including packet #1 and SN=5) via the SC-PTM MRB 124.

In different gNBs, the same packet (e.g., packet 111 or packet #1) may be assigned with different SNs. In FIG. 3, the packet 111 (or packet #1) is assigned with SN=6 by gNB 102, and the packet 111 (or packet #1) is assigned with SN=5 by gNB 103.

In the case that UE 104 moves from the coverage of the source gNB 102 to the coverage of the target gNB 103, a handover occurs. In operation 147 in FIG. 3, a handover procedure of UE 104 from the source gNB 102 to the target gNB 103 is triggered.

During a handover procedure, the source gNB 102 (e.g., a source NG-RAN may transmit a Handover Request to the target gNB 103 (e.g., a target NG-RAN). A NG-Radio Access Node (RAN) is the new RAN defined in conjunction with 5G by 3GPP.

During a handover procedure, a UE index for the UE 104 under handover may be allocated by the source gNB 102 or the target gNB 103. The UE index may be a Cell-Radio Network Temporary Identifier (C-RNTI), a UE ID associated with the an Xn interface, or other suitable IDs. If the UE index is allocated by the source gNB 102, the source gNB 102 forwards the UE index to the target gNB 103 in the Handover Request message. If the UE index is allocated by the target gNB 103, the target gNB 103 forwards the UE index to the source gNB 102 in the Handover Request Acknowledge message. The UE index may be used for setting and identification for a UE-dedicated End Marker indication. In some embodiments, an End Marker indication may be unique for an UE. The source gNB 102 may also transmit a "data forwarding required" indication to the target gNB 103. In some embodiments, a "data forwarding required" indication may be unique for a 5G MBS session or unique for a 5G MBS bearer.

The source gNB 102 may also transmit information of the ongoing 5G MBS session, radio bearer, and mode to the target gNB. The target gNB 103 may decide the use of a PTM mode. According to the "data forwarding required" indication, the target gNB 103 may configure a dedicated DRB to transmit forwarded data packets to the UE (e.g., UE 104). The dedicated DRB may be used to transmit the forwarded data packet received from the source gNB 102.

After the handover procedure from the source gNB 102 to the target gNB 103, the target gNB 103 may transmit a path switch indication of the 5G MBS session to the core network 102 (e.g. Access and Mobility Management Function (AMF) in a 5G core network). The UE index may be transmitted with the path switch indication or may be included in the path switch indication. The AMF forwards the path switch indication to the UPF. The path switch indication may indicate that the UE (e.g., UE 104) is switched to target gNBs and will receive the data for this 5G MBS session in the target gNB 103.

In operation 148 of FIG. 3, the target gNB 103 transmits a path switch indication and the UE index (of UE 104) to the core network 101. In some embodiments, the operation 148 may include some acknowledge message from the core network 101 to the target gNB 103.

Upon receiving the path switch indication and the UE index, the core network 101 (e.g., the UPF) may transmit one or more "End Marker indication with the UE index" packets on the shared bearer (e.g., a GTP-U tunnel) to the source gNB 102 immediately. For example, the core network (e.g., the UPF) may transmit one or more "End Marker indication with the UE index" packets before a certain data packet or between two certain data packets. In some embodiments, the End Marker indication and the UE index may be indicated in a GTP-U header of the 5G MBS Session. In some embodiments, the End Marker indication and UE index may be provided by a GTP-U packet.

In operation 149 of FIG. 3, the core network 101 transmits the packets 112, 113, 114 (or packets #2, #3, #4) and a packet 191 including the End Marker indication and the UE index via the shared bearer 121. The packet 191, including the End Marker indication and the UE index, may be transmitted before packet 114 (or packet #4) or between packets 113 and 114 (or packet #3 and #4).

Upon the receipt of the "End Marker indication with UE index" packet, if forward function is activated for the bearer receiving the "End Marker indication with UE index" packet, the source gNB 102 may forward or transmit the End Marker indication and/or some packets to the target gNB 103 via a shared data forwarding tunnel. In some embodiment, upon the receipt of the "End Marker indication with UE index" packet, the source gNB 102 may identify the UE (e.g., UE 104) by the UE index and forward or transmit the End Marker indication and/or some packets to the target gNB via one or more UE-specific GTP-U tunnels. A dedicated UE-specific GTP-U tunnel between source gNB 102 and target gNB 103 may be established for data packet forwarding. For example, the source gNB 102 may transmit the packets 112 and 113 (or packets #2 and #3) and one or more End Marker indication to the target gNB 103. In some embodiments, the source gNB 102 may transmit the packets 112 and 113 (or packets #2 and #3) with the assigned PDCP SN or COUNT value and one or more End Marker indication to the target gNB 103.

In operation 150 of FIG. 3, the source gNB 102 transmits the packets 112 and 113 (or packets #2 and #3) and the packet 191' (including the End Marker indication) to the target gNB 103. The packets 112 and 113 (or packets #2 and #3) may include SNs assigned by the source gNB 103. In some embodiments, the source gNB 102 may transmit data packets followed by the data packet which is not successfully transmitted to the UE 104, to target gNB 10. In some embodiments, the source gNB 102 may transmit, to the target gNB 103, the data packets which are received before the End Marker indication and have not been acknowledged by the UE 104. In some cases, a dedicated UE specific GTP-U tunnel between source gNB and target gNB can be established for data forwarding. In some cases, a shared GTP-U tunnel between source gNB and target gNB can be established for data forwarding.

The MBS session for UE 105 under the target gNB 103 may be still activated, the corresponding MB S data may be transmitted from the core network 101 to the target gNB 103. In operations 151 of FIG. 3, the core network 101 transmits the packet 112 (or packet #2) to the target gNB 103. Upon receipt of the MBS data from the core network, the target gNB 103 assigns SNs (or PDCP SNs) for the received MBS data (not illustrated in FIG. 3).

The target gNB 103 may transmit the packet with the assigned SN (e.g., a PDCP PDU with the assigned PDCP SN) to the UE 105. In operation 152 of FIG. 3, the target gNB 103 transmits the packet 133 (including packet #2 and SN=6) via the SC-PTM MRB 124.

On detection of an “End Marker indication,” the target gNB 103 may discard the packet including the End Marker indication and transmit the data packets before the End Maker indication via a dedicated DRB or a dedicated unicast bearer associated with SC-PTM MRB 123 or PTP mode of a SC-PTM MRB. The target gNB 103 may continue to use the PDCP SN or COUNT value assigned by the source gNB 102. In some embodiments, the target gNB 103 may use the value of the PDCP SN contained within the DL COUNT Value IE (referring to Downlink COUNT Value Information Element) for the first downlink packet if no PDCP-SN is assigned for the packets from the source gNB 102. The DL COUNT Value IE may be sent from source gNB.

In operation 153 of FIG. 3, upon the receipt of the End Mark indication, the target gNB 103 transmits the packets 112 and 113 (or packets #2 and #3) to the UE 104 via a dedicated DRB or a dedicated bearer 126 associated with SC-PTM MRB 123 or PTP mode of a SC-PTM MRB. The packets 112 and 113 (or packets #2 and #3) may include SNs assigned by the source gNB. In some embodiments, the target gNB 103 may transmit, to the UE 104, the data packets which are received before the End Marker indication from the source gNB.

After the data packets are received from the target gNB 103, the dedicated bearer 126 may be released. For the target gNB 103, once the data packets received before the End Marker indication (i.e., packet 191') have been transmitted or have been acknowledged by the UE 104, the target gNB 103 may release the dedicated bearer 126. For the UE 104, it may release the dedicated bearer 126 when a timer is expired or when it received a command from the core network 101. In some embodiments, the target gNB 103 may transmit the End Marker indication to the UE 104 via the dedicated bearer 126. In this case, the target gNB 103 may release the dedicated bearer 126 when the End Marker indication have been transmitted or have been acknowledged by the UE 104; the UE 104 may release the dedicated bearer 126 when the End Marker indication is received.

The MBS session for UE 105 under the target gNB 103 may be still activated, the corresponding MB S data may be transmitted from the core network 101 to the target gNB 103. In operations 154 of FIG. 3, the core network 101 transmits the packets 113 and 114 (or packets #3 and #4) to the target gNB 103. Upon receipt of the MBS data from the core network, the target gNB 103 may assign SNs (or PDCP SNs) for the received MBS data (not illustrated in FIG. 3).

The target gNB 103 may transmit the packets with the assigned SN (e.g., a PDCP PDU with the assigned PDCP SN) to the UE 105. In operation 155 of FIG. 3, the target gNB 103 transmits the packets 134 and 135 to the UE 105 via the SC-PTM MRB 124. The packet 134 includes packet #3 and SN=7; the packet 135 includes packet #4 and SN=8.

Since the UE 104 joins the MBS session under the target gNB 103, the target gNB 103 may transmit the packets with the assigned SN (e.g., a PDCP PDU with the assigned PDCP SN) to the UE 104. In operation 156 of FIG. 3, the target gNB 103 transmits the packets 134' and 135' via the SC-PTM MRB 124. The packet 134' includes packet #3 and SN=7; the packet 135' includes packet #4 and SN=8. The packets 134' and 135' may be identical to the packets 134 and 135, respectively. As shown in FIG. 3, the UE 104 may receive the data packets #2 and #3 via the dedicated bearer 126 (e.g., a dedicated DRB) from the target gNB 103 (as described in operation 152) and receive the data packets #3 and #4 via SC-PTM MRB 124 from the target gNB 103 (as described in operation 156).

In FIG. 3, when a handover procedure of UE 104 from the source gNB 102 to the target gNB 103 is trigged, the UE 104 may also receive packets via the SC-PTM MRB 124 from the target gNB 103 as shown in FIG. 2. Nevertheless, the UE 104 further receive, via a dedicated bearer (e.g., a dedicated DRB), the packets before the end marker indication, which are forwarded from the source gNB 102 to the target gNB 103. The packets before the end marker indication may include one or more packets that UE 104 does not receive from the SC-PTM MRBs 123 and 124. As a result, no packet is lost during the handover when utilizing the end marker indication and dedicated bearer.

Figure 4:
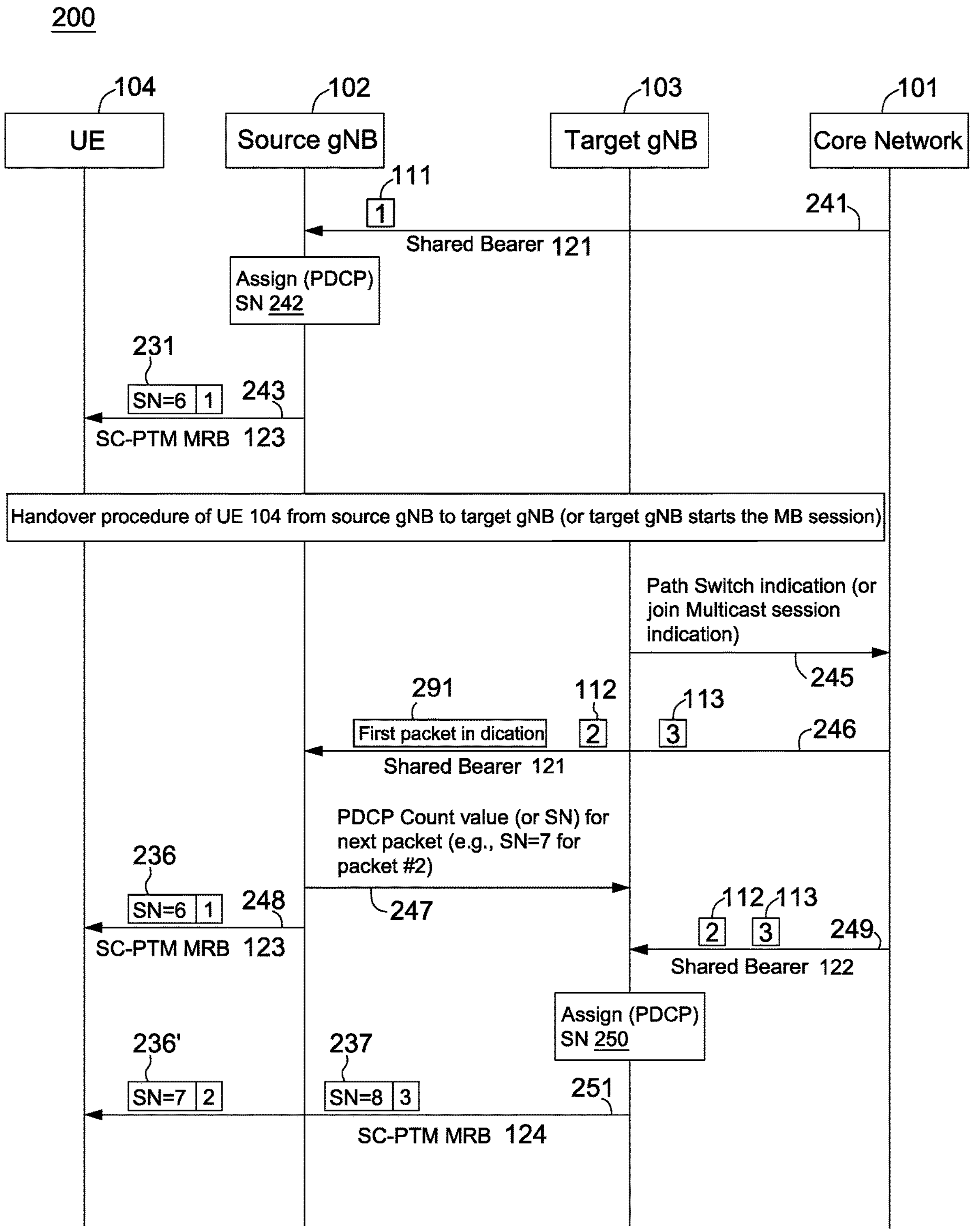
FIG. 4 illustrates a flow diagram illustrating a method for MBS with count value alignment according to some embodiments of the present disclosure.

FIG. 4 is a flow diagram illustrating a method for MBS with count value alignment according to some embodiments of the present disclosure.

In the exemplary method shown in FIG. 4, the PDCP count values between different gNBs are aligned with a “first packet indication” transmitted from the core network.

Data packets for a 5G MBS service in a PTM mode may be transmitted by a MRB (e.g., a SC-PTM MRB 123) in the source gNB 102. A shared bearer 121 (e.g., a shared GTP-U tunnel) may be used between the core network 101 (e.g. a UPF of the core network 101) and the source gNB 102. The shared bearer 121 may transmit data packets of the 5G MBS service for the uses of a MRB and/or unicast data radio bearers (DRBs).

In the exemplary method shown in FIG. 4, the core network 101 may transmit MBS data (i.e., packet 111 or packet #1) to the source gNB 102 via a shared bearer 121 (e.g., a shared GTP-U tunnel). In operation 241 of FIG. 4, the core network 101 transmits the packet 111 (or packet #1) to the source gNB 102 via a shared bearer 121.

Upon receipt of the MB S data packets from the core network, the source gNB 102 assigns continuous SNs (or PDCP SNs, PDCP COUNT value) for the received MBS data packet. In operation 242 of FIG. 4, the source gNB 102 assigns a SN for the received packet 111 (or packet #1).

The source gNB 102 may transmit the packet with the assigned SN (e.g., a PDCP PDU with the assigned PDCP SN) to an UE under the coverage of the source gNB 102 (e.g., UE 104). In operation 243 of FIG. 4, the source gNB 102 transmits the packet 231 (including packet #1 and SN=6) via the SC-PTM MRB 123.

The case that UE 104 moves from the coverage of the source gNB 102 to the coverage of the target gNB is contemplated. In the case that UE 104 moves from the coverage of the source gNB 102 to the coverage of the target gNB, a handover of UE 104 occurs. In operation 244 in FIG. 4, a handover procedure of UE 104 from the source gNB 102 to the target gNB 103 is triggered. In some embodiment, in operation 244, the target gNB may start the MBS which is identical to the MBS activated by the UE 104 and the source gNB 102.

The target gNB 103 may be triggered to establish the 5G MBS session between the target gNB 103 and the core network 101. For example, the target gNB 103 may transmits a path switch indication or a join multicast service indication to the core network. The core network 101 may be aware of that gNB2 start to transmit the packets of the 5G MBS Session. For example, the core network 101 may be aware of that gNB2 start to transmit the packets of the 5G MBS Session which is already activated between the UE 104 and the source gNB 102. The path switch indication may be carried by a NG interface message. The path switch indication may include the 5G MBS Session ID or Temporary mobile group identity (TMGI). The join multicast service indication may be provided in a (Internet Protocol) IP layer. In operation 245 of FIG. 4, the target gNB 103 transmits a path switch indication or a joint multicast session indication to the core network.

Upon receipt of the path switch indication or the joint multicast session indication, the core network 101 may transmit a "first packet indication" to source gNB 102, which indicates a first data packet to be transmitted to the UE under handover by the target gNB. The core network 101 (e.g. a UPF) may transmit a "first packet indication of the target gNB 103" to the source gNB 102. The first packet indication may be carried in the GTP-U header. The first packet indication may indicate which of the current packet, the next packet, and the previous packet may be the first packet sent from the core network 101 to the target gNB 103. The first packet indication may include information of the target gNB 103 e.g. an ID of the gNB 103.

In operation 246 of FIG. 4, the core network 101 transmits the packet 291 including a "first packet indication." The first packet indication may be followed by the subsequent data packets for the MBS session between UE 104 and the source gNB 102. For example, the packet 291 may be followed by packets 112 and 113 (or packets #2 and #3). Upon receipt of the packets 112 and 113 (or packets #2 and #3) from the core network, the source gNB 102 may assign SNs (or PDCP SNs) for packets 112 and 113 (or packets #2 and #3) (not illustrated in FIG. 4).

The source gNB 102 may transmit the corresponding PDCP COUNT value to the target gNB 103. The source gNB 102 may transmit the PDCP COUNT value of the packet indicated in the "first packet indication" (e.g., the current packet, the next packet, or the previous packet). The source gNB 102 may transmit the PDCP COUNT value to the target gNB 103 according to the information of target gNB 103 (which may be in the first packet indication). The PDCP COUNT value may be in a First PDCP Count Value IE in SN STATUS TRANSFER message or a new non-UE associated message from the source gNB 102 to the target gNB 103.

In operation 247 of FIG. 4, the source gNB 102 transmits an indication to the target gNB 103. The indication transmitted by the source gNB 102 may indicate the PDCP COUNT value (or SN) for the next packet. For example, the indication from the source gNB 102 to the target gNB 103 indicates that SN=7 for the first packet received by the target gNB 103 (i.e., packet #2 or packet 112).

In operation 248 of FIG. 4, the source gNB 102 may still transmit the packet 236 (including packet #2 and SN=7) to the UE 104 via the SC-PTM MRB 123. The source gNB 102 may transmit the indication as described in operation 247 and transmit the packet 236 (including packet #2 and SN=7) to the UE 104 (as described in operation 248). In some embodiments, the source gNB 102 may not transmit the packet 236 to the UE 104.

Since the MBS session under the target gNB 103 may be activated due to the operation 244, the corresponding MBS data may be transmitted from the core network 101 to the target gNB 103. In some embodiments, the first data packet transmitted from the core network 101 to the target gNB 103 may be the data packet transmitted to the source gNB 102 after the "first packet indication." In operations 249 of FIG. 4, the core network 101 transmits the packets 112 and 113 (or packets #2 and #3) to the target gNB 103. The packet 112 (or packet #2) is the first data packet transmitted from the core network 101 to the target gNB 103 which is identical to the packet 112 (or packet #2) transmitted to the source gNB 102 after the "first packet indication."

Upon receipt of the packets 112 and 113 (or packets #2 and #3) from the core network, the target gNB 103 assigns SNs (or PDCP SNs) for the packets 112 and 113 (or packets #2 and #3). The target gNB 103 may assign the first packet received from the core network 101 with the PDCP COUNT value (or SN) indicated by the source gNB 102. The target gNB 103 may continuously assign PDCP COUNT values (or SNs) for the subsequent packets. The target gNB 103 may assign the PDCP COUNT value indicated in the First Count Value IE for the first received packet from core network 101 and assign continuous PDCP COUNT values for subsequently received packets. In operation 250 of FIG. 4, the target gNB assign the first received packet (i.e., packet #2 or packet 112) with SN=7. The PDCP COUNT values between the source gNB 102 and the target gNB 103 may be aligned. For the subsequently received packets, the target gNB 103 may assign with continuous PDCP COUNT values (or SNs). For example, the target gNB assigns the second received packet (i.e., packet #3 or packet 113) with SN=8.

Since the UE 104 joins the MBS session under the target gNB 103, the target gNB 103 may transmit the packets with the assigned SN (e.g., a PDCP PDU with the assigned PDCP SN) to the UE 104. In operation 251 of FIG. 4, the target gNB 103 transmits the packets 236' and 237 via the SC-PTM MRB 124. The packet 236' includes packet #2 and SN=7; the packet 237 includes packet #3 and SN=8. The packet 236' may be identical to the packet 236. UE 104 may receive all packets and no packet is lost during a handover.

In some embodiments, the gNB 102 and the gNB 103 may a source gNB and a target gNB during handover, respectively. In some other embodiments, the gNB 102 may be an anchor gNB for PDCP COUNT value allocation, and the gNB 103 may be a served gNB of the anchor gNB.

Figure 5:
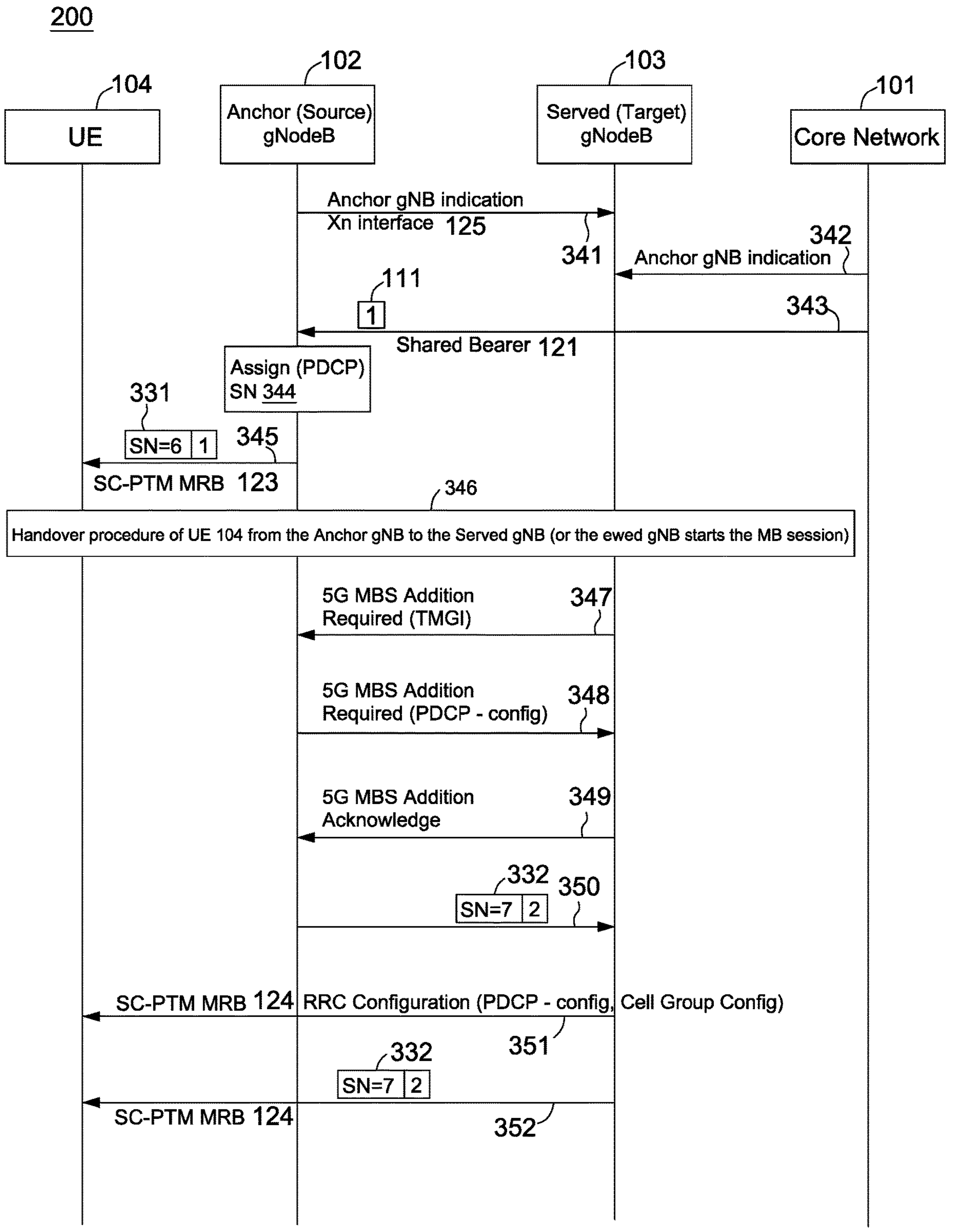
FIG. 5 illustrates a flow diagram illustrating a method for MBS with count value alignment according to some embodiments of the present disclosure.

FIG. 5 is a flow diagram illustrating a method for MBS with count value alignment according to some embodiments of the present disclosure.

In the exemplary method shown in FIG. 5, in order to keep PDCP SN or COUNT value alignment between gNBs, an anchor PDCP concept is proposed. The PDCP SN or COUNT value assignment function for a specific 5G MBS data transmission is only provided in a single gNB. A gNB with PDCP SN or COUNT value assignment function is defined as an anchor gNB. The anchor gNB may be selected in a specific area. Other gNBs for the same 5G MBS data transmission in the specific area may be connected with the anchor gNB. The gNBs connected with the anchor gNB for the same 5G MBS data transmission in the specific area may be defined as served gNBs.

As shown in the FIG. 5, the anchor gNB 102 may have a 5G MBS Session connection with the core network 101. The data for the 5G MBS Session may be processed in a PDCP layer of the anchor gNB 102. The anchor gNB (or a primary gNB) may distribute the associated PDCP PDUs to neighbor gNBs (or secondary gNBs, served gNBs, slave gNBs) via an Xn interface.

In the exemplary method shown in FIG. 5, the served gNB 103 may get the information of the anchor gNB 102 from the anchor gNB 102 or from core network 101 or by the Operation and Maintenance (OAM) configuration distributed in the network or system. Different anchor gNBs may be assigned for different 5G MBS service. For example, different anchor gNB may be selected for different MBS session which is identified by a TMGI. When an anchor gNB is determined for a specific 5G MB service, the anchor gNB may transmit the information of the anchor gNB to neighbor gNBs through an Xn Setup or an Xn Configuration update procedure under an Xn interface. Alternatively, the anchor gNB may transmit the information of the anchor gNB to the core network, and the core network may forward the information of the anchor gNB to the neighbor gNBs through an NG Setup or an NG Configuration update message under an NG interface.

In operation 341, the anchor gNB 102 transmits an anchor gNB indication to the served gNB 103. The anchor gNB indication may include the information of the anchor gNB 102. The anchor gNB indication may be transmitted from the anchor gNB 102 to the served gNB 103 via an Xn interface.

Alternatively, the anchor gNB 102 may transmit the information of the anchor gNB 102 to the core network 101 and then the core network 101 informs the served gNB 103 of the information of the anchor gNB. In operation 342, the core network 101 transmits an anchor gNB indication to the served gNB 103. The anchor gNB indication may include the information of the anchor gNB 102. The anchor gNB indication may be transmitted from the core network 101 to the served gNB 103 via a NG interface. In view of the above, step 341 or step 342 may be performed alternatively.

The core network 101 may transmit MBS data (i.e., packet 111 or packet #1) to the anchor gNB 102 via a shared bearer 121 (e.g., a shared GTP-U tunnel). In operation 343 of FIG. 5, the core network 101 transmits the packets 111 and 112 (or packets #1 and #2) to the anchor gNB 102 via a shared bearer 121.

Upon receipt of the MBS data packets from the core network, the anchor gNB 102 assigns continuous SNs (or PDCP SNs, PDCP COUNT value) for the received MBS data packet. In operation 344 of FIG. 5, the anchor gNB 102 assigns continuous SNs for the received packets 111 and 112 (or packets #1 and #2).

The anchor gNB 102 may transmit the packet with the assigned SN (e.g., a PDCP PDU with the assigned PDCP SN) to an UE under the coverage of the anchor gNB 102 (e.g., UE 104). In operation 345 of FIG. 5, the anchor gNB 102 transmits the packet 2331 (including packet #1 and SN=6) via the SC-PTM MRB 123.

The case that UE 104 moves from the coverage of the anchor gNB 102 to the coverage of the served gNB 103 is contemplated. In the case that UE 104 moves from the coverage of the anchor gNB 102 to the coverage of the served gNB 103, a handover of UE 104 occurs. In operation 346 in FIG. 5, a handover procedure of UE 104 from the anchor gNB 102 to the served gNB 103 is triggered. In some embodiments, in operation 346, the served gNB may start the MB service which is identical to the MB S activated by the UE 104 and the anchor gNB 102.

When a served gNB 103 want to establish a MRB for the 5G MBS service, the served gNB 103 may transmit an 5G MBS Addition Required message to the anchor gNB. In operation 347 in FIG. 5, the served gNB 103 transmit a 5G MBS Addition Required message to the anchor gNB 102. The message includes the 5G MB S Session ID (e.g. TMGI).

In response to the 5G MBS Addition Required message from the served gNB 103, the anchor gNB 102 may transmit a 5G MBS Addition Request message to the served gNB 103. In operation 348 of FIG. 5, the anchor gNB 102 transmits a 5G MBS Addition Request message to the served gNB 103. The 5G MBS Addition Request message from the anchor gNB 102 may include PDCP related configurations (PDCP-config) for one or more associated 5G MRBs. The PDCP related configuration may be carried in a Radio Resource Control (RRC) container, e.g., RadioBearerConfig IE. A list MRB may be included because a 5G MBS Session may include multiple MRBs.

In response to the 5G MBS Addition Request message from the anchor gNB 102, the served gNB 103 may transmit a 5G MBS Addition Acknowledge message to the anchor gNB 102. In operation 349 of FIG. 5, the served gNB 103 transmit a 5G MBS Addition Acknowledge message to the anchor gNB 102.

GTP-U tunnel (TNL) information (e.g., Internet protocol (IP) address and Tunnel endpoint identifier (TED)) may be allocated for one or more associated MRBs by the served gNB 103. The served gNB 103 may also transmit the GTP-U TNL information to the anchor gNB 102 through the 5G MBS Addition Acknowledge message. A GTP-U tunnel may establish between the anchor gNB 102 and the served gNB 103 with the GTP-U TNL information.

The anchor gNB 102 may transmits subsequent PDCP PDUs for the 5G MBS to the served gNB 103 via the GTP-U tunnel, in which the transmitted PDCP PDUs have been assigned with the SNs or the COUNT values by the anchor gNB 102. In operation 350 of FIG. 5, the anchor gNB 102 transmits packet 332 (including packet #2 and SN=7) to the served gNB 103. In some embodiments, the anchor gNB 102 may transmit PDCP SDUs to the served gNB 103 via the GTP-U tunnel, in which the PDCP SDU may not include SNs or COUNT values assigned by the anchor gNB 102, but the SNs or COUNT values may be allocated by the anchor gNB 102 and transmitted in the GTP-U header.

The served gNB 103 may transmit a RRC MRB configuration message to UE 104 to establish a MRB between the served gNB 103 and the UE 104. The RRC MRB configuration message may include a PDCP-Config (PDCP related configuration) from the anchor gNB 102 and a lower configuration (e.g. cell group configuration including RLC, MAC and PHY configurations) generated by the served gNB 103. In operation 351 of FIG. 5, the served gNB 103 transmit a SC-PTM MRB RRC configuration message to the UE 104 to establish a SC-PTM MRB between the served gNB 103 and the UE 104.

After a MRB is established between the served gNB 103 and the UE 104, the served gNB 103 may transmit packets, which may be receive from the anchor gNB 102, to the UE 104. In operation 352 of FIG. 5, the served gNB 103 transmits the packet 332 (including SN=7 and packet #2) to the UE 104 via the SC-PTM MRB 124. The packet 332 transmitted from the served gNB 103 to the UE 104 is received from the anchor gNB 102 in operation 350. UE 104 may receive all packets and no packet is lost during a handover. The SC-PTM MRB 124 is established through the message and configurations transmitted in operation 351.

If the case that UE 104 further moves from the coverage of the served gNB 103 to the coverage of a new gNB, the new gNB performs steps 347 to 350 with the anchor gNB 102, so as to assign the same PDCP SN as the anchor gNB 102.

Figure 6:
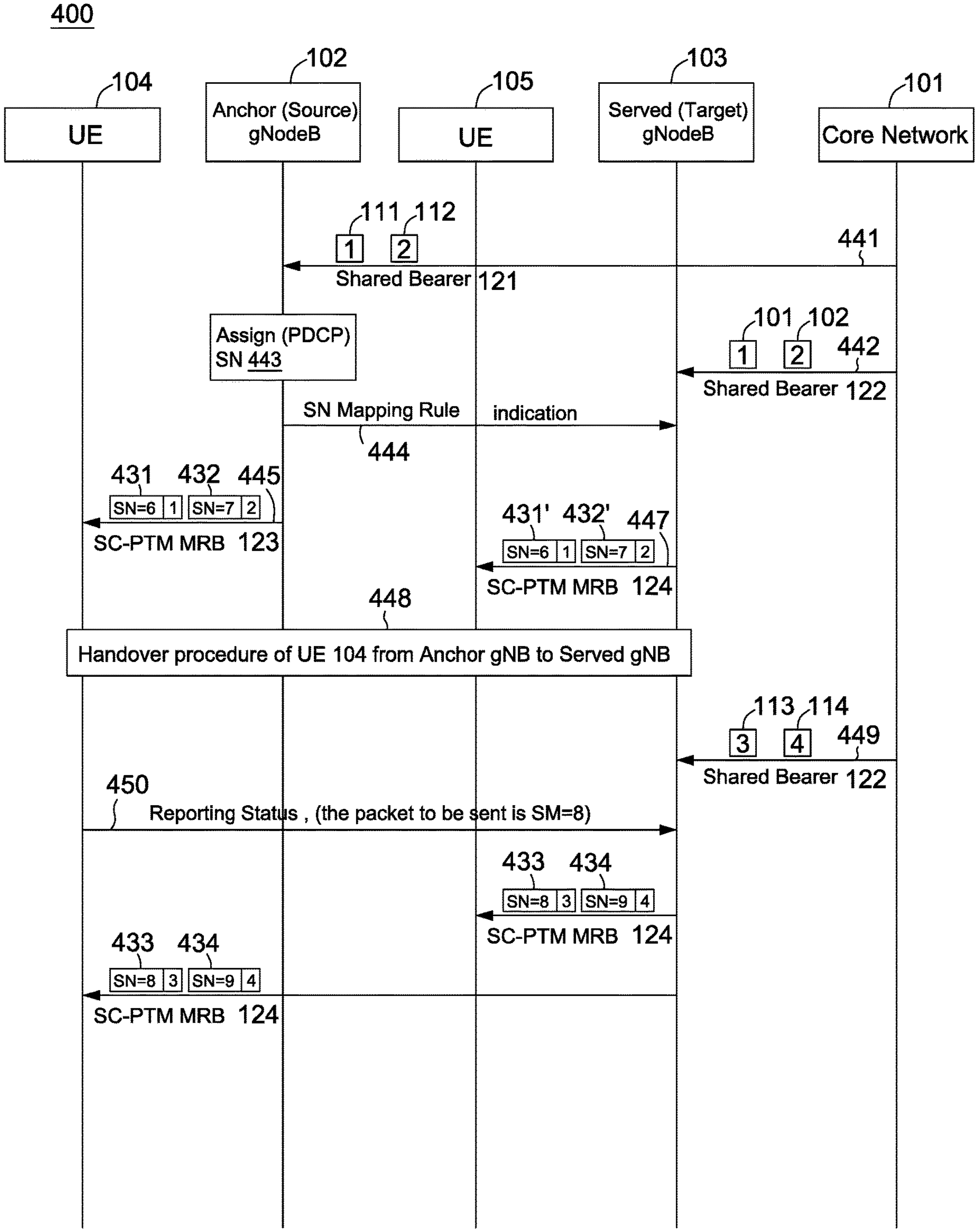
FIG. 6 illustrates a flow diagram illustrating a method for MBS with count value alignment according to some embodiments of the present disclosure.

FIG. 6 illustrates a flow diagram illustrating a method for MBS with count value alignment according to some embodiments of the present disclosure In the exemplary method shown in FIG. 6, the PDCP SNs between different gNBs are aligned based on the information from the core network 101. For example, the gNBs may assign same PDCP SN or COUNT value a packet based on some sequence numbers of the packet (e.g. GTP-U SN, SYNC info, or other SN assigned by the core network).

In FIG. 6, the core network 101 may transmit MBS data (i.e., packets 111 and 112 or packets #1 and #2) to the anchor gNB 102 and the served gNB 103. In operation 441 of FIG. 6, the core network 101 transmits the packets 111 and 112 (or packets #1 and #2) to the anchor gNB 102 via a shared bearer 121. In operation 442 of FIG. 6, the core network 101 transmits the same packets 111 and 112 (or packets #1 and #2) to the served gNB 103 via a shared bearer 122. The shared bearers 121 and 122 may be a GTP-U tunnel.

Upon receipt of the MBS data from the core network, the anchor gNB 102 assigns SNs (or PDCP SNs, PDCP COUNT values) for the received MBS data. In operation 443 of FIG. 6, the anchor gNB 102 assigns SNs for the received packets 111 and 112 (or packets #1 and #2).

The anchor gNB may transmit the assigned PDCP SNs (or PDCP COUNT values) and SN Mapping Rule indication to the neighbor gNBs (or served gNBs). The neighbor gNBs may use the same PDCP SNs (or PDCP COUNT values) for the packets with same SN assigned by the core network 101. In operation 444 of FIG. 6, the anchor gNB 102 transmits a SN Mapping Rule indication to the served gNB 103. The SN Mapping Rule indication may include one or more PDCP SNs assigned by the anchor gNB (e.g., SN=6 and/or SN=7) and the mapping rule between the PDCP SN and a SN assigned by the core network 101. For example, the mapping rule may include "SN=6 for packet #1" and/or "SN=7 for packet #2," in which "#1" and "#2" are assigned by the core network 101.

In LTE, the synchronized radio interface transmission from the cells controlled by different eNBs requires a SYNC-protocol support between the Broadcast Multicast Service Centre (BM-SC) and the eNBs. As part of the SYNC-protocol procedures the BM-SC shall include within the SYNC PDU packets a time stamp, in which the time stamp tells the time when the eNB sends MBMS data over the air interface. The SYNC PDU header information includes time stamp, packet number, and elapsed octet counter. If the SYNC protocol is used in 5G MBS, the anchor gNB may allocated PDCP COUNT value (or PDCP SN) associated with one or more SYNC header information and send the mapping between PDCP COUNT value (or PDCP SN) and the SYNC header information to the neighbor gNB (or served gNBs). The neighbor gNBs (or served gNBs) may use same PDCP COUNT value (or PDCP SN) for the packet having same SYNC header information.

The GTP-U header may also include two bytes sequence number. The anchor gNB may allocated PDCP COUNT values (or PDCP SNs) based on an SN in the GTP-U header (e.g., a GTP-U SN) and transmit the mapping rule between PDCP COUNT value (or PDCP SN) and the GTP-U SN to the neighbor gNBs (or served gNBs). The neighbor gNBs (or served gNBs) may use same PDCP COUNT value (or PDCP SN) for the packet with same GTP-U SN.

For example, the gNBs may assign same PDCP SN or COUNT value a packet based on sequence numbers of the packet. A new SN of NG interface can be added for the packet from CN. The CN adds SN for each packet. The SN of NG interface can be included in a "RAN container" in a GTP-U extension header. For example, the gNBs assign same PDCP SN or count value with the SN of NG interface.

After assigning the PDCP SN, the anchor gNB 102 may transmit the packet with the assigned SN (e.g., a PDCP PDU with the assigned PDCP SN) to an UE under the coverage of the anchor gNB 102 (e.g., UE 104). In operation 445 of FIG. 6, the anchor gNB 102 transmits the packet 431 (including packet #1 and SN=6) and the packet 432 (including packet #2 and SN=6) to the UE 104 via the SC-PTM MRB 123.

Upon receipt of the MBS data from the core network and the SN Mapping Rule indication, the served gNB 103 assigns PDCP SNs (or PDCP COUNT values) for the received MBS data. In operation 446 of FIG. 6, the served gNB 103 assigns SNs for the received packets 111 and 112 (or packets #1 and #2). The served gNB 103 may transmit the packet with the assigned SN (e.g., a PDCP PDU with the assigned PDCP SN) to an UE under the coverage of the target gNB 103 (e.g., UE 105). In operation 447 of FIG. 6, the served gNB 103 transmits the packet 431' (including packet #1 and SN=6) and packet 432' (including packet #2 and SN=7) to the UE 105 via the SC-PTM MRB 124. The packets 431' and 432' may be identical to packets 431 and 432, respectively.

The case that UE 104 moves from the coverage of the source gNB 102 to the coverage of the target gNB is contemplated. In the case that UE 104 moves from the coverage of the source gNB 102 to the coverage of the target gNB, a handover of UE 104 occurs. In operation 448 in FIG. 6, a handover procedure of UE 104 from the anchor gNB 102 to the served gNB 103 is triggered. The MB S session for UE 105 under the served gNB 103 may be still activated, the corresponding MBS data may be transmitted from the core network 101 to the served gNB 103. In operations 449 of FIG. 6, the core network 101 transmits the packets 113 and 114 (or packets #3 and #4) to the target gNB 103. Upon receipt of the MB S data from the core network, the target gNB 103 assigns PDCP SNs (or PDCP COUNT values) for the received MBS data. In FIG. 6, the operation of assigning PDCP SNs (or PDCP COUNT values) for the packets 113 and 114 (or packets #3 and #4) is not illustrated in FIG. 6. Upon the receipt of the packets 113 and 114 (or packets #3 and #4), and the served gNB 103 may assign PDCP SNs (or PDCP COUNT values) for the packets 113 and 114 (or packets #3 and #4) based on the mapping rule indicated in the SN Mapping Rule indication transmitted in operation 444.

After a handover procedure, the UE who enters a new gNB may report, to the new gNB, the status of the received packets. For example, the UE may report the new gNB the PDCP SN of the next packet to be sent or to be received. In operation 450 of FIG. 6, the UE 104 reports the status of the received packet to the served gNB 103. For example, the UE 104 reports the next packet to be sent (or to be received) is SN=8.

The target gNB 103 may transmit the packet with the assigned SN (e.g., a PDCP PDU with the assigned PDCP SN) to the UE 105. In operation 451 of FIG. 6, the served gNB 103 transmits the packet 433 (including packet #3 and SN=8) and the packet 434 (including packet #4 and SN=9) to the UE 105 via the SC-PTM MRB 124. In operation 452 of FIG. 6, the served gNB 103 transmits the packet 433 (including packet #3 and SN=8) and the packet 434 (including packet #4 and SN=9) to the UE 104 via the SC-PTM MRB 124. Since the PDCP SNs (or PDCP COUNT values) between the anchor gNB 102 and the served gNB 103 are aligned, no packet is lost during the handover of the UE 104.

Figure 7:
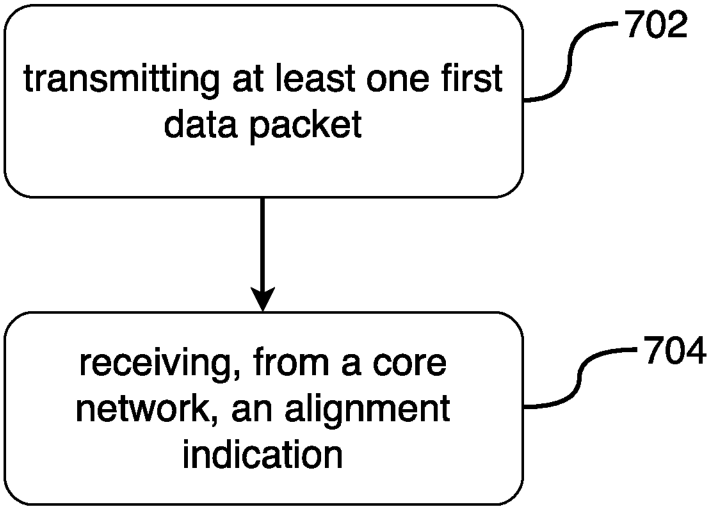
FIG. 7 is a flow chart illustrating a method for MBS according to some embodiments of the present disclosure.

FIG. 7 is a flow chart illustrating a method for MBS according to some embodiments of the present disclosure. The method may be a method for a handover of a user equipment (UE) from a first NB to a second NB and performed by the first NB (e.g., the source gNB 102).

In the exemplary method shown in FIG. 7, in step 702, the first NB may transmit at least one first data packet. In step 704, the first NB may receive, from a core network, an alignment indication. According to some embodiments, the alignment indication is for aligning PDCP SNs or PDCP COUNT values assigned by different NodeB for the same data packet.

In some embodiments, the alignment indication may be an End Marker indication that indicates an end of data packets to be transmitted to the second NodeB. The alignment indication may comprise an end marker indicated in a General packet radio service Tunneling Protocol-User plane packet (GTP-U) header. A UE index of the UE may be received by the source gNB along with the alignment indication from the core network via a shared GTP-U tunnel. The shared GTP-U tunnel is used for data transmission of both multicast bearer and unicast bearer for a 5G Multicast and Broadcast Service (MBS).

In the above embodiments with End Marker indication, the method may further comprise transmitting the end marker to the second NodeB via a UE specific GTP-U tunnel, wherein the UE specific GTP-U tunnel is based on the UE index; or transmitting the UE index with the end marker to the second NodeB via the shared GTP-U tunnel.

In the above embodiments with End Marker indication, the method may further comprise transmitting at least one second data packet followed by the first data packet to the second NodeB, wherein the at least one second data packet is determined based on the alignment indication. In some cases, a dedicated UE specific GTP-U tunnel between source gNB and target gNB can be established for data forwarding. In some another cases, a shared GTP-U tunnel between source gNB and target gNB can be established for data forwarding.

In the above embodiments with End Marker indication, the method may further comprise allocating the UE index for the UE, and sending the UE index to the second NodeB in a handover request message. The UE index for the UE may b received from the second NodeB in handover request acknowledge message. The at least one second data packet comprises a Packet Data Convergence Protocol PDCP Service Data Unit (SDU).

In some embodiments, the alignment indication may be a first packet indication indicating at least one second data packet to be firstly transmitted by the second NobeB to the UE under handover. The method in FIG. 7 further comprises transmitting a sequence number of the second data packet to the second NodeB. The sequence number comprises PDCP SN or PDCP count value.

Figure 8:
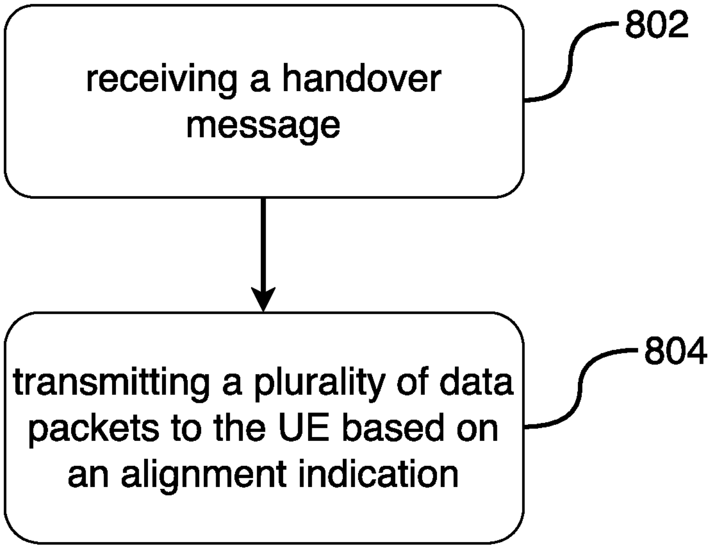
FIG. 8 is a flow chart illustrating a method for MBS according to some embodiments of the present disclosure.

FIG. 8 is a flow chart illustrating a method for MBS according to some embodiments of the present disclosure. The method may be performed by the second NB (e.g., the gNB 103) for a handover of a user equipment (UE) from a first NB to a second NB.

In the exemplary method shown in FIG. 8, in step 802, the second NB may receive a handover message. In step 804, the second NB may transmit a plurality of data packets to the UE based on an alignment indication.

According to some embodiments, the alignment indication comprises an end marker indicated by a General packet radio service Tunneling Protocol-User plane (GTP-U) packet. In this case, the method of FIG. 8 may further comprise receiving the alignment indication via a UE specific GTP-U tunnel, wherein the UE specific GTP-U tunnel is based on an UE index. Alternatively, the method of FIG. 8 may further comprise receiving the alignment indication with an UE index via the shared GTP-U tunnel. The shared GTP-U tunnel may be used for data transmission of both multicast bearer and unicast bearer for a 5G Multicast and Broadcast Service (MBS). The plurality of data packets comprises a Packet Data Convergence Protocol PDCP Service Data Unit (SDU).

According to some embodiments, the alignment indication indicates an end of data packets to be received from the first NodeB. In this case, the method of FIG. 8 may further comprise, in response to the handover message, transmitting a path switch indication message and an UE index of the UE to a core network. The UE index may be allocated by the second NodeB in response to the handover message. Alternatively, the UE index may be received from the first NodeB. In this case, the method of FIG. 8 may further comprise receiving at least one first data packet and the alignment indication from the first NodeB, wherein the at least one first data packet is determined based on the alignment indication. In this case, the method of FIG. 8 may further comprise transmitting the at least one first data packet to the UE via a unicast bearer; and transmitting at least one second data packet to the UE via a multicast radio bearer (MRB).

According to some embodiments, the alignment indication indicates a first data packet to be firstly transmitted by the second NodeB to the UE among the plurality of data packets. In this case, the method of FIG. 8 may further comprise receiving, from the first NodeB, a first sequence number of the first data packet assigned by the first NodeB; and assigning a second sequence number of the first data packet identical to the first sequence number before transmitting the first data packet to the UE. The first sequence number and the second sequence number comprise PDCP SN or PDCP count value. In this case, the method of FIG. 8 may further comprise, in response to the handover message, transmitting a path switch indication message to a core network FIG. 9 is a flow chart illustrating a method for MBS according to some embodiments of the present disclosure.

The method may be performed by a network entity (e.g., the core network 101) for a handover from a first NB to a second NB and.

Figure 9:
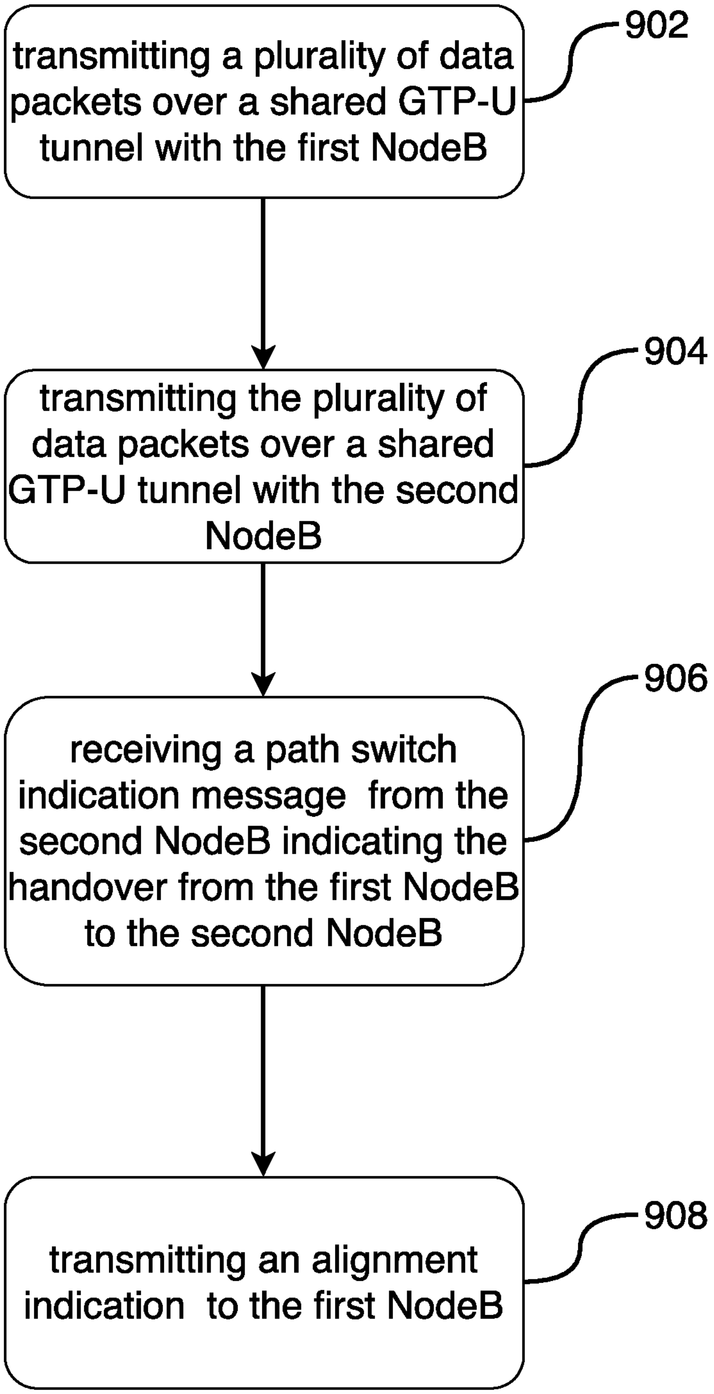
FIG. 9 is a flow chart illustrating a method for MBS according to some embodiments of the present disclosure.

In the exemplary method shown in FIG. 9, in step 902, the network entity may transmit a plurality of data packets over a shared GTP-U tunnel with the first NB. In step 904, the network entity may transmit the plurality of data packets over a shared GTP-U tunnel with the second NB. In step 906, the network entity may receive a path switch indication message from the second NB indicating the handover from the first NB to the second NB. In step 908, the network entity may transmit an alignment indication to the first NB.

According to some embodiments, the alignment indication indicates an end of data packets to be transmitted from the first NodeB to the second NodeB. The alignment indication may comprise an end marker indicated by a General packet radio service Tunneling Protocol-User plane (GTP-U) packet. A UE index for an UE to be handover is transmitted with the alignment indication. The UE index may be transmitting with the alignment indication via a shared GTP-U tunnel. The shared GTP-U tunnel is used for data transmission of both multicast bearer and unicast bearer for a 5G Multicast and Broadcast Service (MBS).

According to some embodiments, the alignment indication indicates a first data packet to be firstly transmitted by the second NodeB to the UE. The alignment indication comprises a sequence number of the first data packet. The sequence number comprises PDCP SN or PDCP count value.

Figure 10:
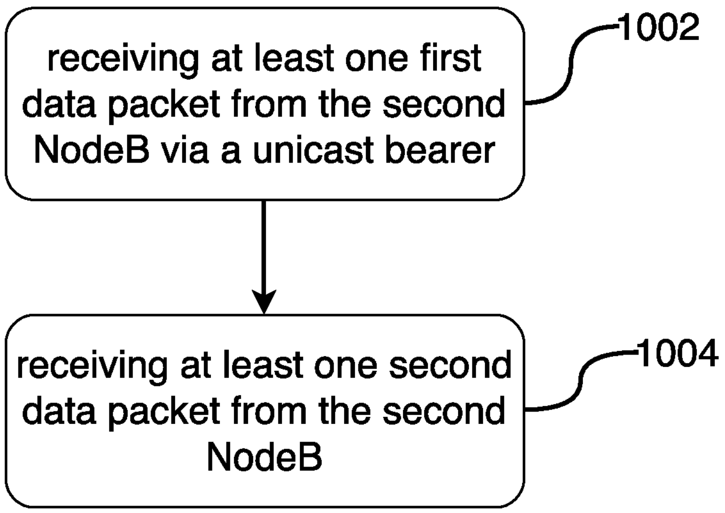
FIG. 10 is a flow chart illustrating a method for MBS according to some embodiments of the present disclosure.

FIG. 10 is a flow chart illustrating a method for MBS according to some embodiments of the present disclosure. The method may be a method for a handover of a user equipment (UE) from a first NB to a second NB and performed by the UE (e.g., the UE 104), wherein, the at least one first data packet is forwarded from the first NodeB.

In the exemplary method shown in FIG. 10, in step 1002, the UE may receive at least one first data packet from the second NB via a unicast bearer. In step 1004, the UE may receive at least one second data packet from the second NB.

Figure 11:
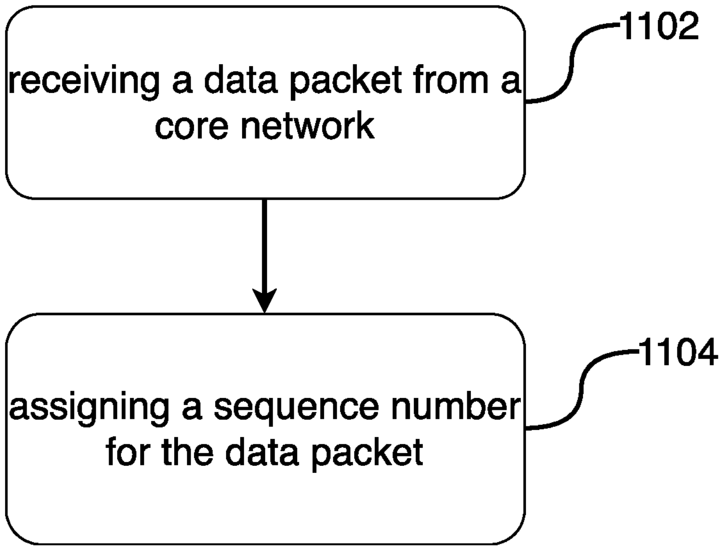
FIG. 11 is a flow chart illustrating a method for MBS according to some embodiments of the present disclosure.

FIG. 11 is a flow chart illustrating a method for MBS according to some embodiments of the present disclosure. The method may be a method performed by an anchor NB (e.g., the gNB 102).

In the exemplary method shown in FIG. 11, in step 1102, the anchor NB may receive a data packet from a core network. In step 1104, anchor NB may assign a sequence number for the data packet.

The sequence number may comprise PDCP SN or PDCP count value. The method of FIG. 11 may further comprise transmitting an anchor indication message to the first NodeB. The method of FIG. 11 may further comprise receiving a message requiring multicast and broadcast services (MBS) from the first NodeB; and/or transmitting a request message to the first NodeB including packet data convergence protocol (PDCP) configuration. The sequence number of the data packet may be transmitted to the first NodeB via a PDCP protocol data unit (PDU) or a PDCP service data unit (SDU) with SN indication. The sequence number of the data packet may be determined based on GTP-U serial number or synchronization information in sync protocol. Transmitting the sequence number of the data packet to the first NodeB may comprise transmitting a generation method of the sequence number to the first NodeB.

Figure 12:
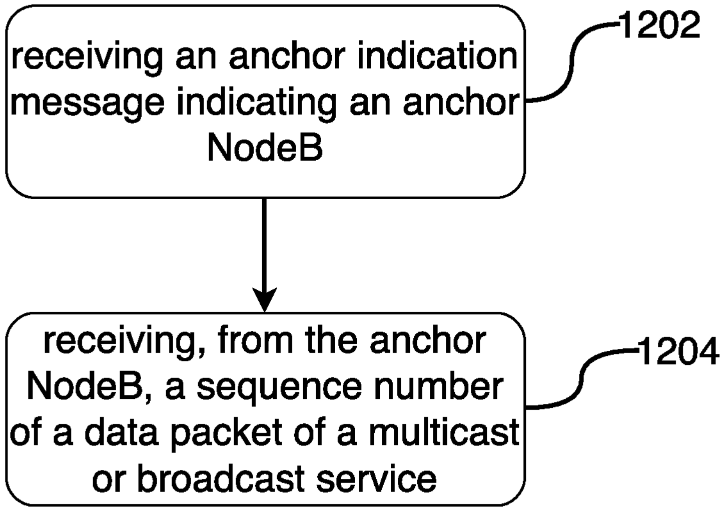
FIG. 12 is a flow chart illustrating a method for MBS according to some embodiments of the present disclosure.

FIG. 12 is a flow chart illustrating a method for MBS according to some embodiments of the present disclosure. The method may be a method performed by a NB (e.g., the gNB 103).

In the exemplary method shown in FIG. 12, in step 1202, the NB may receive an anchor indication message indicating an anchor NB. In step 1104, anchor NB may receive, from the anchor NB, a sequence number of a data packet of a multicast or broadcast service a sequence number for the data packet.

The sequence number may comprise PDCP SN or PDCP count value. The anchor indication message is received from a core network or an anchor NodeB. The method of FIG. 12 may further comprise transmitting a message requiring multicast and broadcast services (MBS) to the anchor NodeB; and/or receiving a request message from the anchor NodeB including packet data convergence protocol (PDCP) configuration. The sequence number of the data packet is transmitted to the first NodeB via a PDCP packet data unit (PDU) or a PDCP service data unit (SDU) with SN indication. The sequence number of the data packet is determined based on GTP-U serial number or synchronization information. The step of receiving, from the anchor NodeB, the sequence number of the data packet of a multicast or broadcast service may comprise receiving a generation method of the sequence number.

Figure 13:
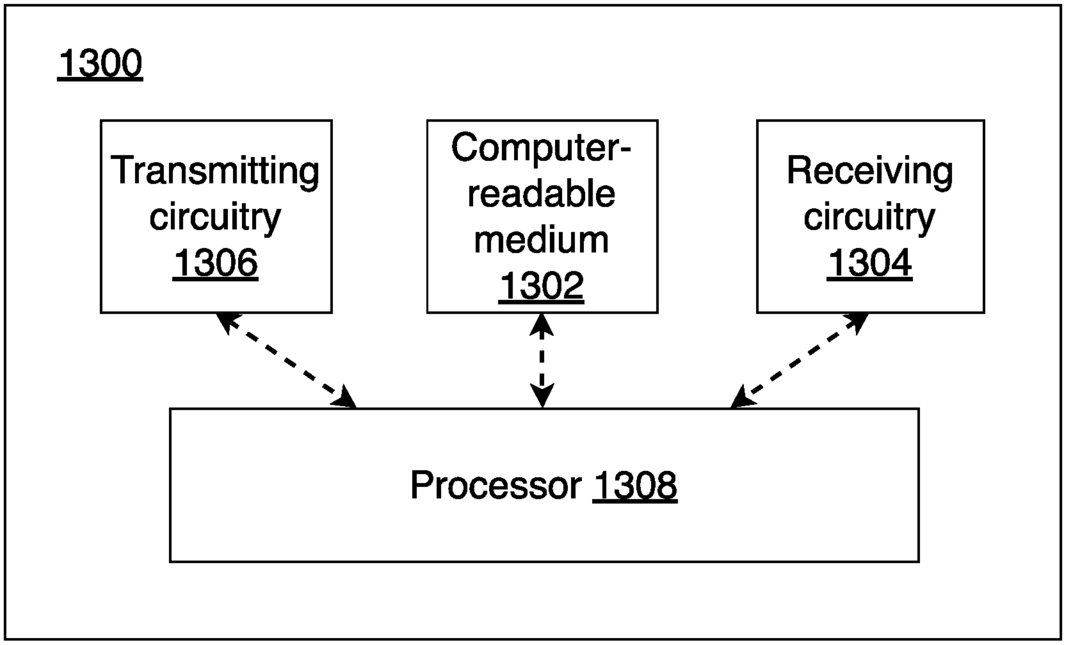
FIG. 13 illustrates a simplified block diagram of an apparatus for MBS according to some embodiments of the present disclosure.

FIG. 13 illustrates a simplified block diagram of an apparatus 1300 according to some embodiments of the present disclosure. The apparatus 1300 may be a gNB 102 or a gNB 103 of the present disclosure.

Referring to FIG. 13, the apparatus 1300 may include at least one non-transitory computer-readable medium 1302, at least one receiving circuitry 1304, at least one transmitting circuitry 1306, and at least one processor 1308. In some embodiment of the present disclosure, at least one receiving circuitry 1304 and at least one transmitting circuitry 1306 and be integrated into at least one transceiver. The at least one non-transitory computer-readable medium 1302 may have computer executable instructions stored therein. The at least one processor 1308 may be coupled to the at least one non-transitory computer-readable medium 1302, the at least one receiving circuitry 1304 and the at least one transmitting circuitry 1306. The computer executable instructions can be programmed to implement a method with the at least one receiving circuitry 1304, the at least one transmitting circuitry 1306 and the at least one processor 1308. The method can be a method according to an embodiment of the present disclosure, for example, one of the methods shown in FIGS. 2-8, 11, and 12.

Figure 14:
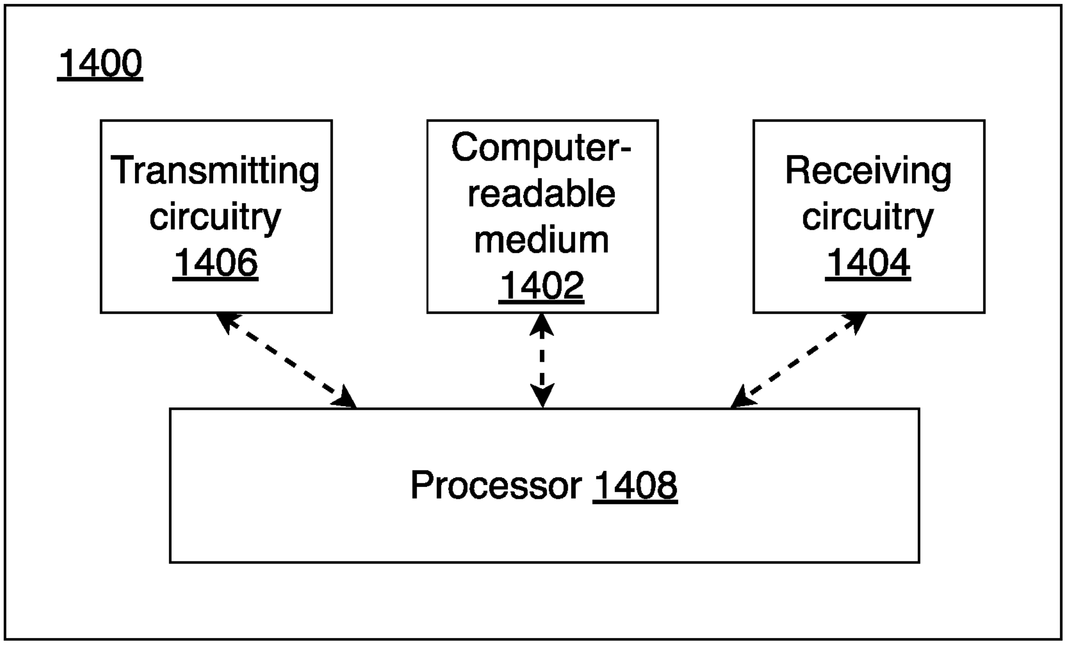
FIG. 14 illustrates a simplified block diagram of an apparatus for MBS according to some embodiments of the present disclosure.

FIG. 14 illustrates a simplified block diagram of an apparatus 1400 according to some embodiments of the present disclosure. The apparatus 1400 may be a core network 101 of the present disclosure.

Referring to FIG. 14, the apparatus 1400 may include at least one non-transitory computer-readable medium 1402, at least one receiving circuitry 1404, at least one transmitting circuitry 1406, and at least one processor 1408. In some embodiment of the present disclosure, at least one receiving circuitry 1404 and at least one transmitting circuitry 1406 and be integrated into at least one transceiver. The at least one non-transitory computer-readable medium 1402 may have computer executable instructions stored therein. The at least one processor 1408 may be coupled to the at least one non-transitory computer-readable medium 1402, the at least one receiving circuitry 1404 and the at least one transmitting circuitry 1406. The computer executable instructions can be programmed to implement a method with the at least one receiving circuitry 1404, the at least one transmitting circuitry 1406 and the at least one processor 1408. The method can be a method according to an embodiment of the present disclosure, for example, one of the methods shown in FIGS. 2-6, and 9.

Figure 15:
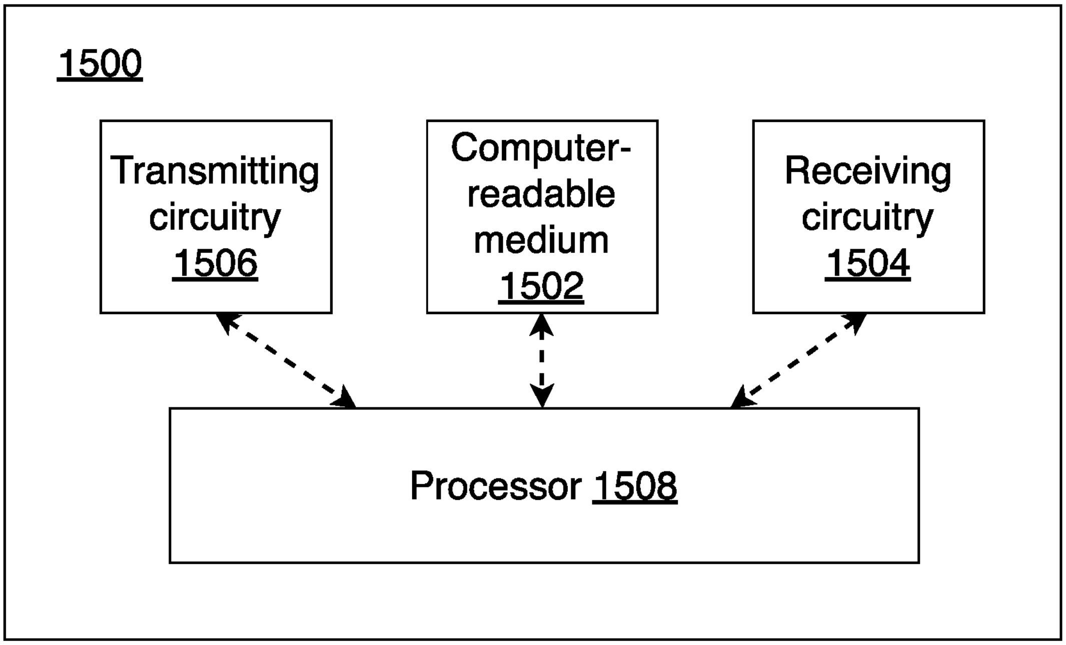
FIG. 15 illustrates a simplified block diagram of an apparatus for MBS according to some embodiments of the present disclosure.

FIG. 15 illustrates a simplified block diagram of an apparatus 1500 according to some embodiments of the present disclosure. The apparatus 1500 may be a UE 104 or a UE 105 of the present disclosure.

Referring to FIG. 15, the apparatus 1500 may include at least one non-transitory computer-readable medium 1502, at least one receiving circuitry 1504, at least one transmitting circuitry 1506, and at least one processor 1508. In some embodiment of the present disclosure, at least one receiving circuitry 1504 and at least one transmitting circuitry 1506 and be integrated into at least one transceiver. The at least one non-transitory computer-readable medium 1502 may have computer executable instructions stored therein. The at least one processor 1508 may be coupled to the at least one non-transitory computer-readable medium 1502, the at least one receiving circuitry 1504 and the at least one transmitting circuitry 1506. The computer executable instructions can be programmed to implement a method with the at least one receiving circuitry 1504, the at least one transmitting circuitry 1506 and the at least one processor 1508. The method can be a method according to an embodiment of the present disclosure, for example, one of the methods shown in FIGS. 2-6 and 10.

The method according to embodiments of the present disclosure can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. The method may be a method as stated above or other method according to an embodiment of the present disclosure.

An alternative embodiment preferably implements the methods according to embodiments of the present disclosure in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present disclosure provides a non-transitory, computer-readable storage medium having computer programmable instructions stored therein. The computer programmable instructions are configured to implement a method as stated above or other method according to an embodiment of the present disclosure.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed is:

1. A method performed by an anchor NodeB, the method comprising:

receiving a data packet with a first sequence number from a core network, wherein the first sequence number comprises a General Packet Radio Service (GPRS) Tunneling Protocol User plane (GTP-U) serial number (SN) or synchronization information or a new SN assigned by the core network; and assigning a second sequence number for the data packet based on the first sequence number information, wherein the second sequence number comprises a Package Data Convergence Protocol (PDCP) Sequence number (SN) or a PDCP count value;

wherein the anchor NodeB provides sequence numbers for served base stations in a multicast or broadcast service area.

2. The method of claim 1, further comprising:

transmitting the second sequence number of the data packet to a first NodeB, that is a served base station of the anchor NodeB.

3. The method of claim 1, further comprising:

transmitting an anchor indication message to the first NodeB;

receiving a message requiring multicast and broadcast services (MBS) from the first NodeB; and transmitting a request message to the first NodeB including packet data convergence protocol (PDCP) configuration.

4. A base station comprising:

at least one non-transitory computer-readable medium; and at least one processor coupled to the at least one non-transitory computer-readable medium and which is configured to cause the base station to:

receive a data packet from a core network, the data packet comprising a first sequence number (SN) comprising a General Packet Radio Service (GPRS) Tunneling Protocol User plane (GTP-U) serial number (SN) or synchronization information or a new SN assigned by the core network; and assign a second sequence number for the data packet, wherein the sequence number comprises Package Data Convergence Protocol (PDCP) Sequence number (SN) or PDCP count value;

wherein the base station is configured as an anchor base station that provides sequence numbers for served base stations in a multicast or broadcast service area.

5. The base station of claim 4, wherein the at least one processor is configured to cause the base station to:

transmit the second sequence number of the data packet to a first NodeB that is a served base station of the anchor base station.

* * * * *